United States Patent
Nakamura et al.

(10) Patent No.: US 7,483,005 B2
(45) Date of Patent: Jan. 27, 2009

(54) DISPLAY DEVICE

(75) Inventors: Takashi Nakamura, Saitama (JP); Hirotaka Hayashi, Fukaya (JP)

(73) Assignee: Toshiba Matsushita Display Technology Co., Ltd., Tokyo-To (JP)

( * ) Notice: Subject to any disclaimer, the term of this patent is extended or adjusted under 35 U.S.C. 154(b) by 713 days.

(21) Appl. No.: 10/975,378

(22) Filed: Oct. 29, 2004

(65) Prior Publication Data
US 2005/0093851 A1    May 5, 2005

(30) Foreign Application Priority Data
Oct. 31, 2003    (JP)    ............................... 2003-373237

(51) Int. Cl.
*G09G 3/36*    (2006.01)

(52) U.S. Cl. ..................... 345/87; 345/204; 345/104; 345/96

(58) Field of Classification Search .................. 345/87, 345/204, 104, 96
See application file for complete search history.

(56) References Cited

U.S. PATENT DOCUMENTS

| | | | | |
|---|---|---|---|---|
| 5,892,493 A * | 4/1999 | Enami et al. | ................... | 345/94 |
| 6,236,063 B1 | 5/2001 | Yamazaki et al. | | |
| 6,243,069 B1 * | 6/2001 | Ogawa et al. | ................ | 345/102 |
| 6,747,638 B2 | 6/2004 | Yamazaki et al. | | |
| 7,280,102 B2 * | 10/2007 | Abileah et al. | .............. | 345/204 |
| 2004/0217928 A1 | 11/2004 | Yamazaki et al. | | |
| 2005/0093851 A1 | 5/2005 | Nakamura et al. | | |

FOREIGN PATENT DOCUMENTS

| | | |
|---|---|---|
| CN | 1319831 A | 10/2001 |
| JP | 2000-267067 | 9/2000 |
| JP | 2001-292276 | 10/2001 |

OTHER PUBLICATIONS

U.S. Appl. No. 11/503,962, filed Aug. 15, 2006, Nakamura.

* cited by examiner

*Primary Examiner*—Richard Hjerpe
*Assistant Examiner*—Leonid Shapiro
(74) *Attorney, Agent, or Firm*—Oblon, Spivak, McClelland, Maier & Neustadt, P.C.

(57) ABSTRACT

A display device has display elements provided inside of pixels formed in vicinity of signal lines and scanning lines aligned in matrix form, a plurality of image capture circuits, each capturing image at a certain range of a subject, and being provided one for every multiple pixels, a scanning line drive circuit which drives the scanning lines, a signal line drive circuit which drives the signal lines, a pixel voltage supply control circuit which controls whether or not to supply a pixel voltage to the corresponding signal line, and a pre-charge voltage supply control circuit which controls whether or not to supply a pre-charge voltage capable of changing voltage level for each signal line to the corresponding signal line.

2 Claims, 22 Drawing Sheets

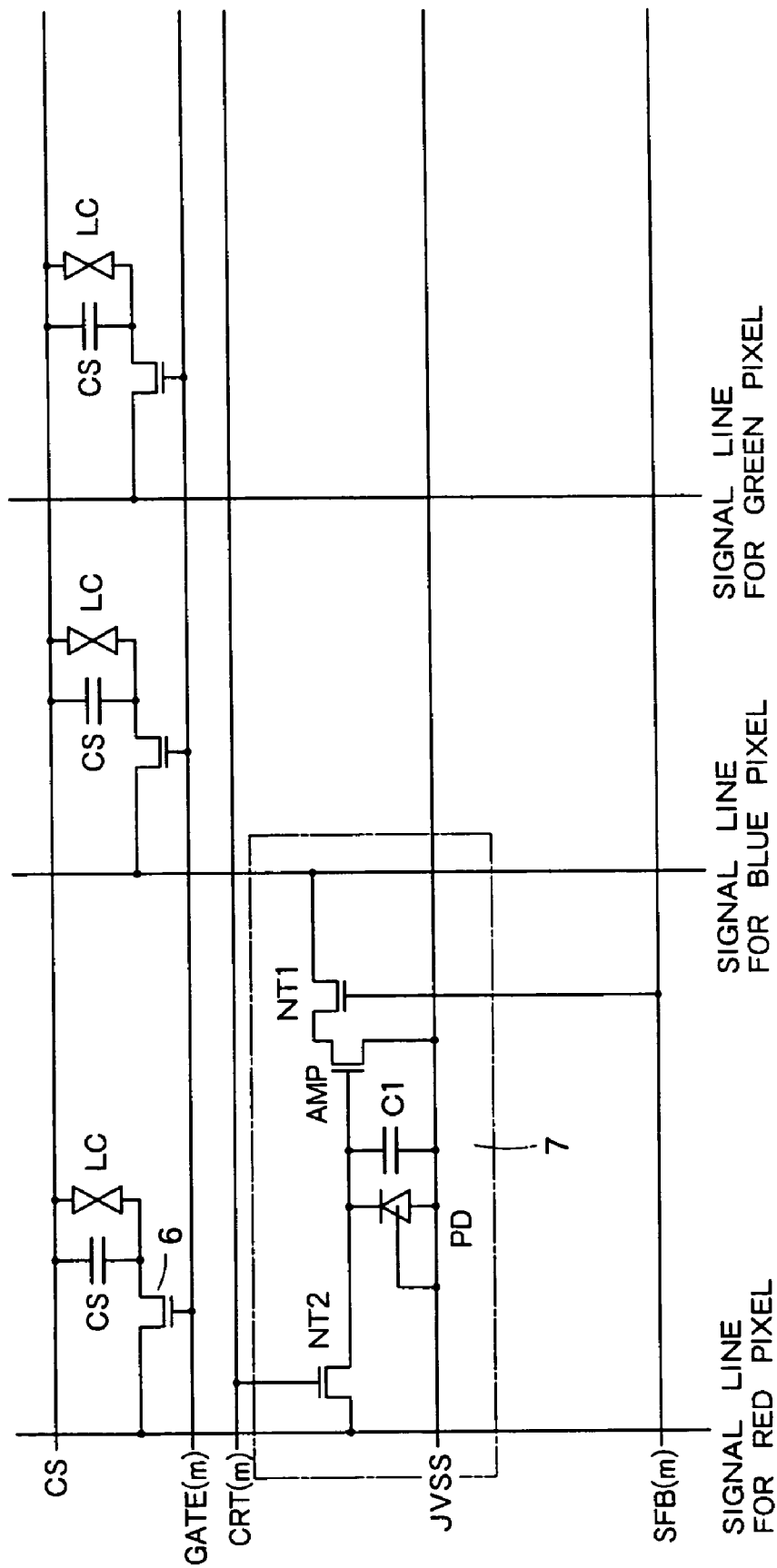
F I G. 2

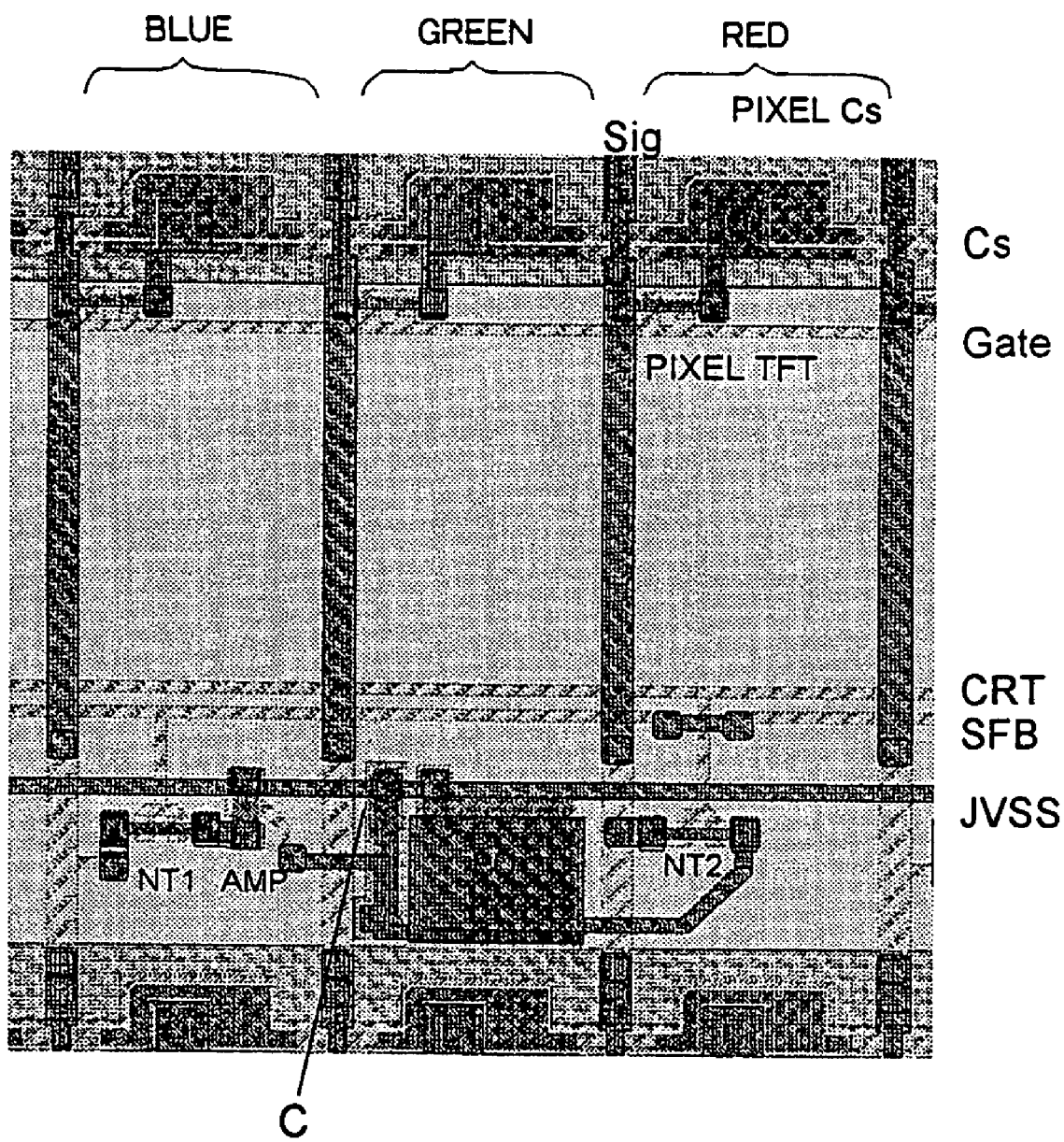
F I G. 3

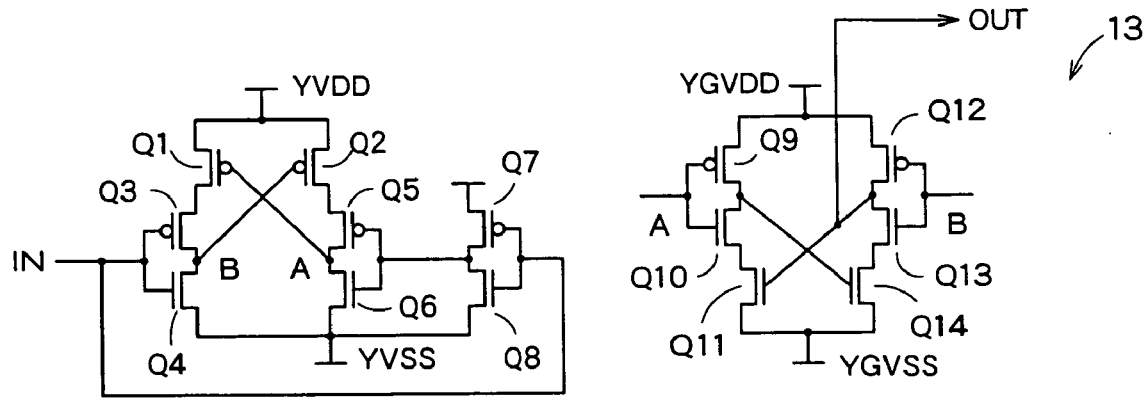
F I G. 5
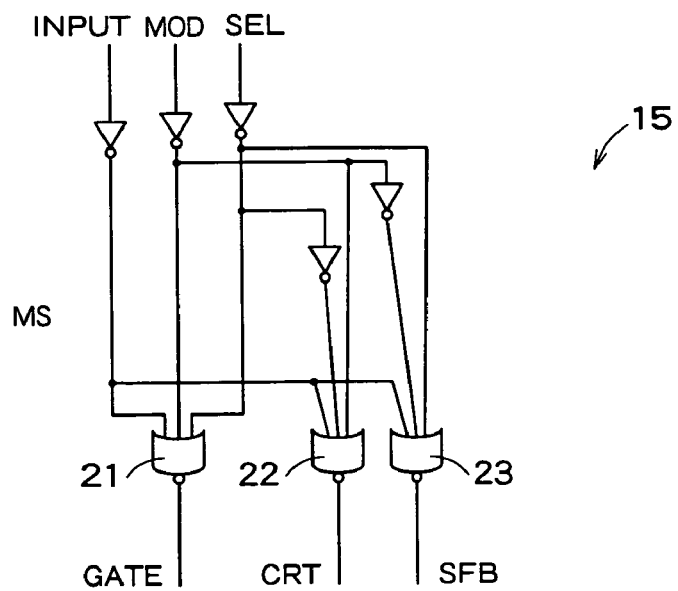
F I G. 6

| MOD | SEL | |
|---|---|---|
| 0 | 0 | NOTHING |
| 0 | 1 | OUTPUT TO SFB FOR EACH LINE |
| 1 | 0 | OUTPUT TO CRT FOR EACH LINE |
| 1 | 1 | OUTPUT TO GATE FOR EACH LINE |

MUX : H...ALL THE GATES ARE "H"
MUX : L...NORMAL

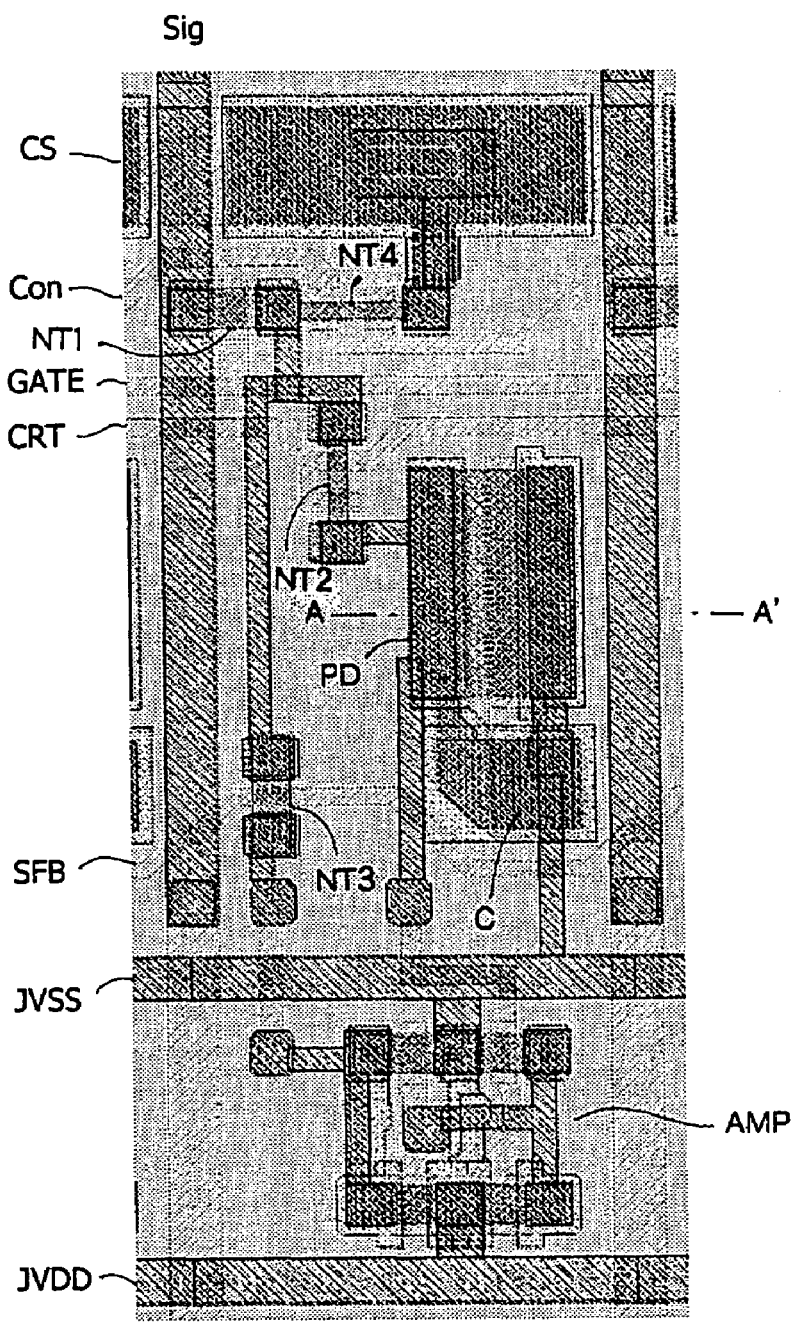
F I G. 13

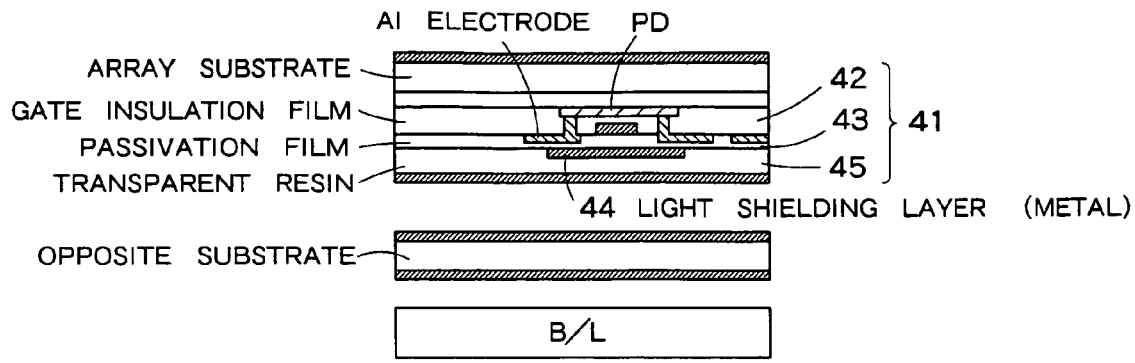
F I G. 14
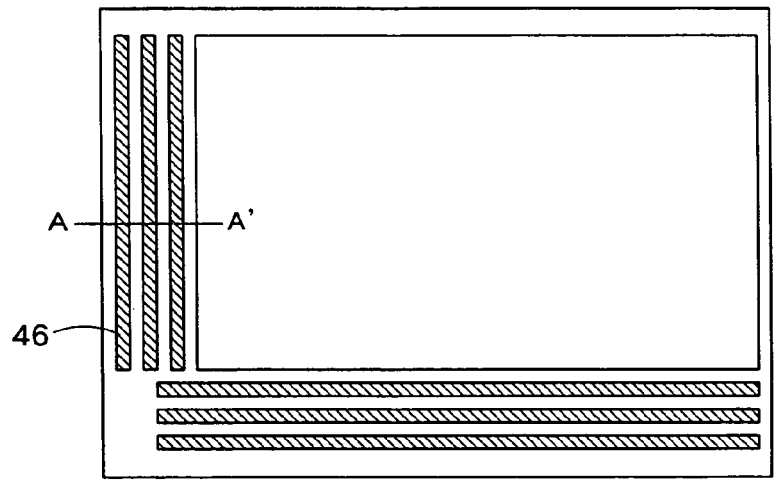
F I G. 15
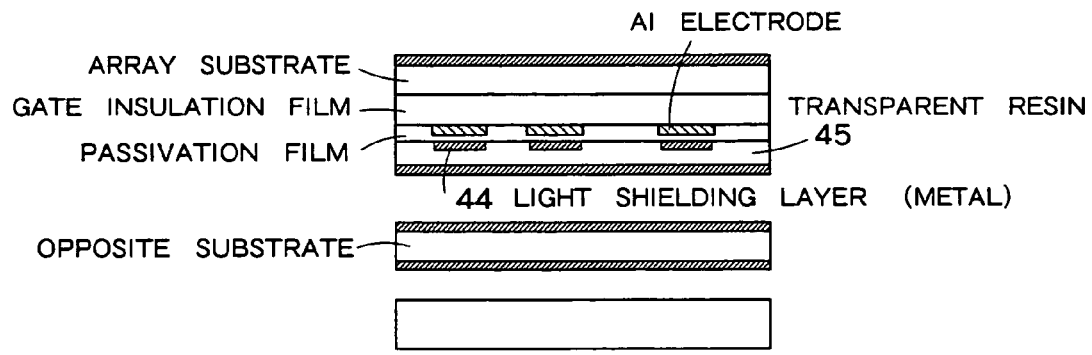
F I G. 16

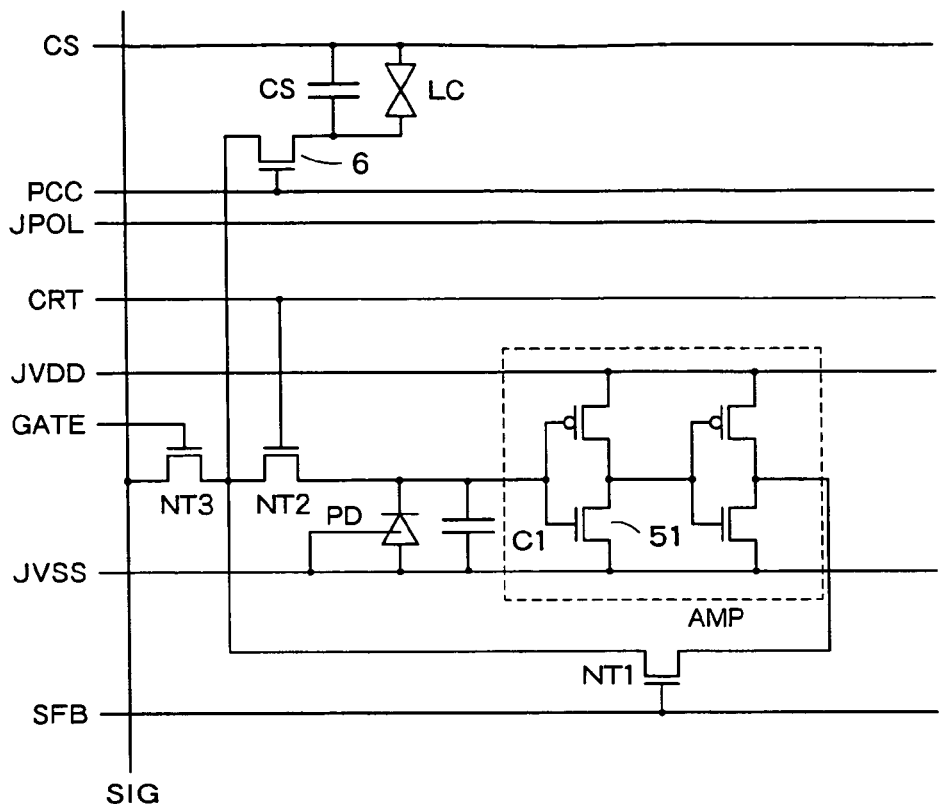
F I G. 17
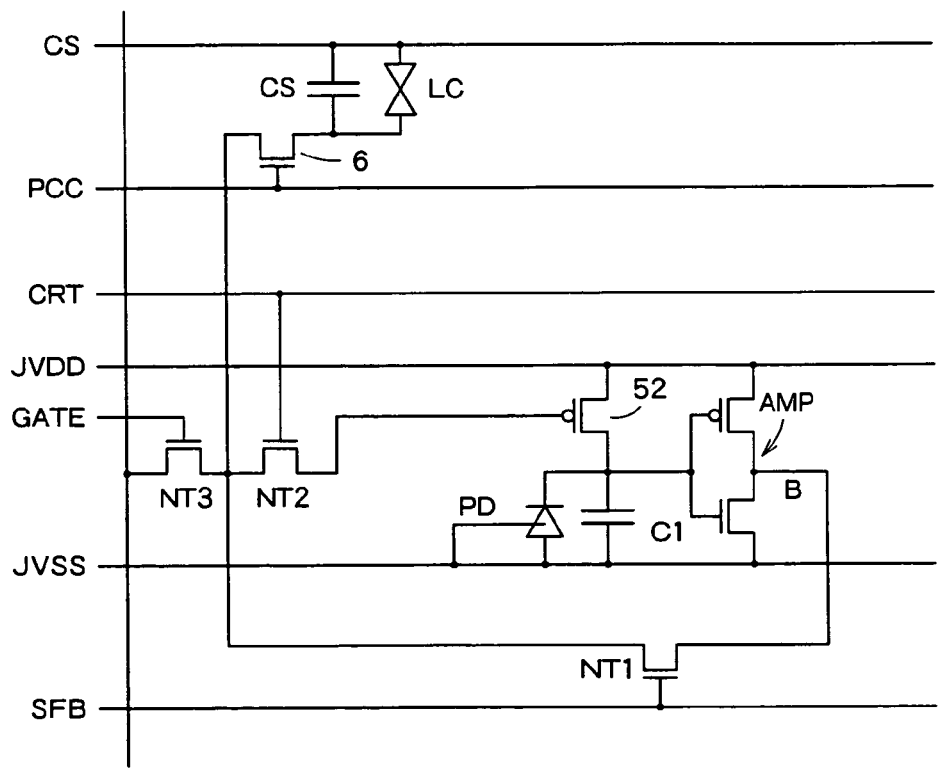
F I G. 18

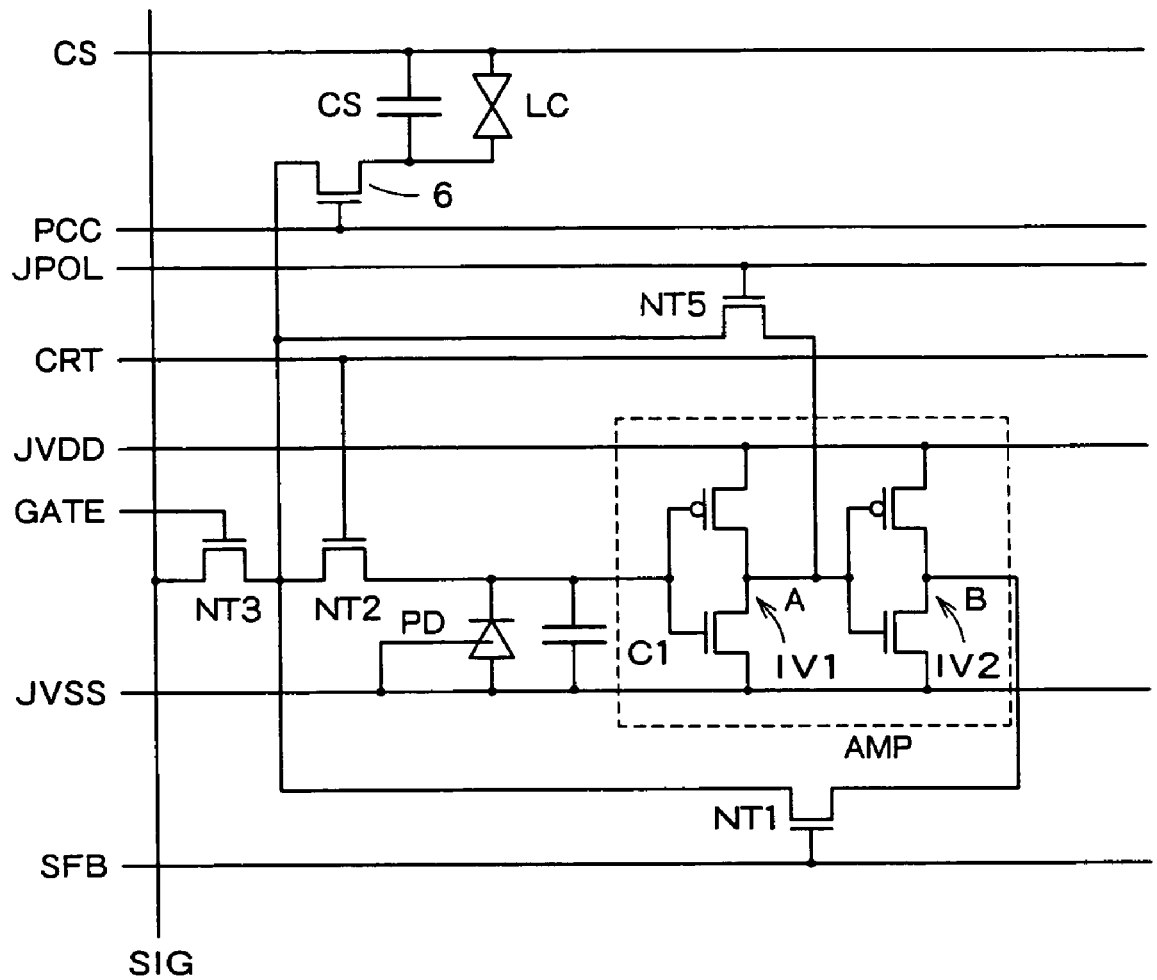
F I G. 19

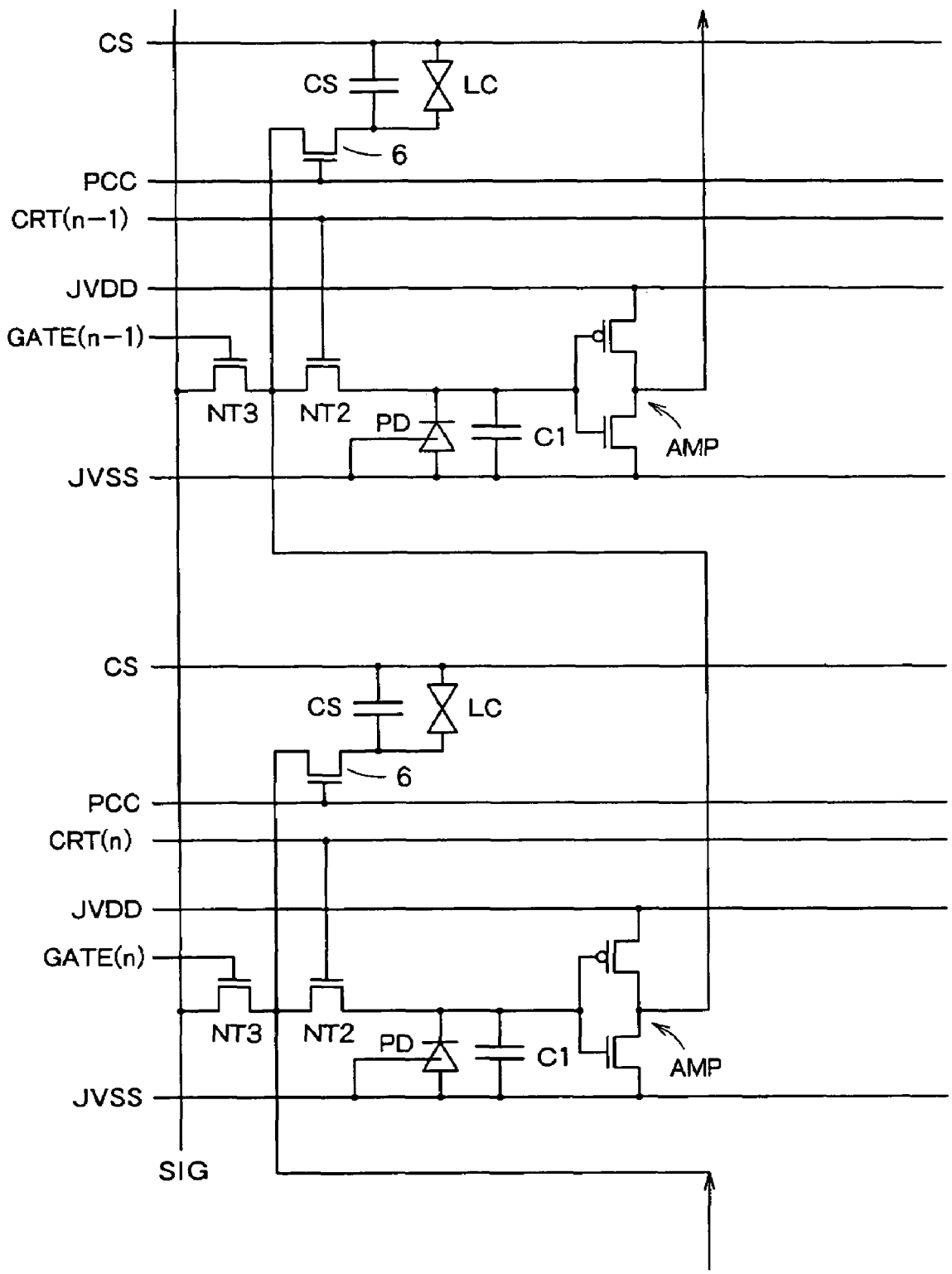
F I G. 20

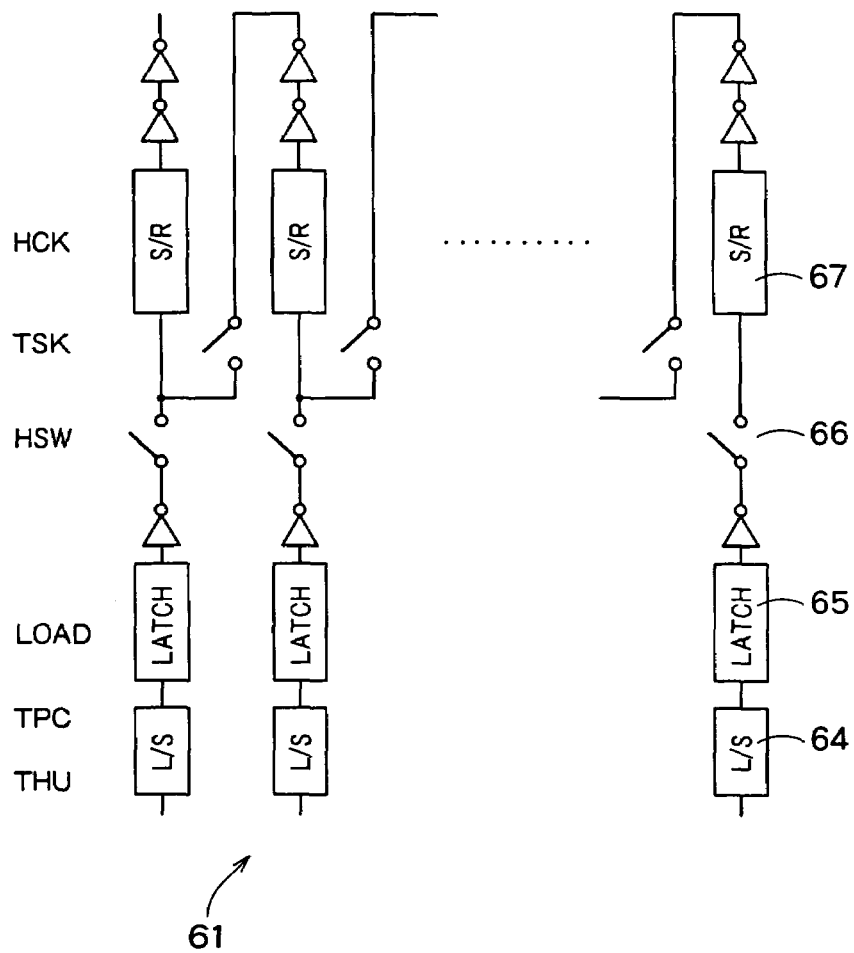
F I G. 22
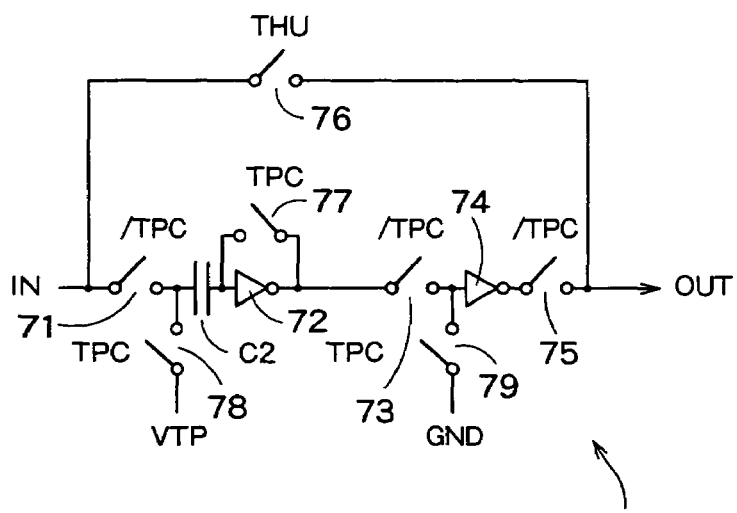
F I G. 23

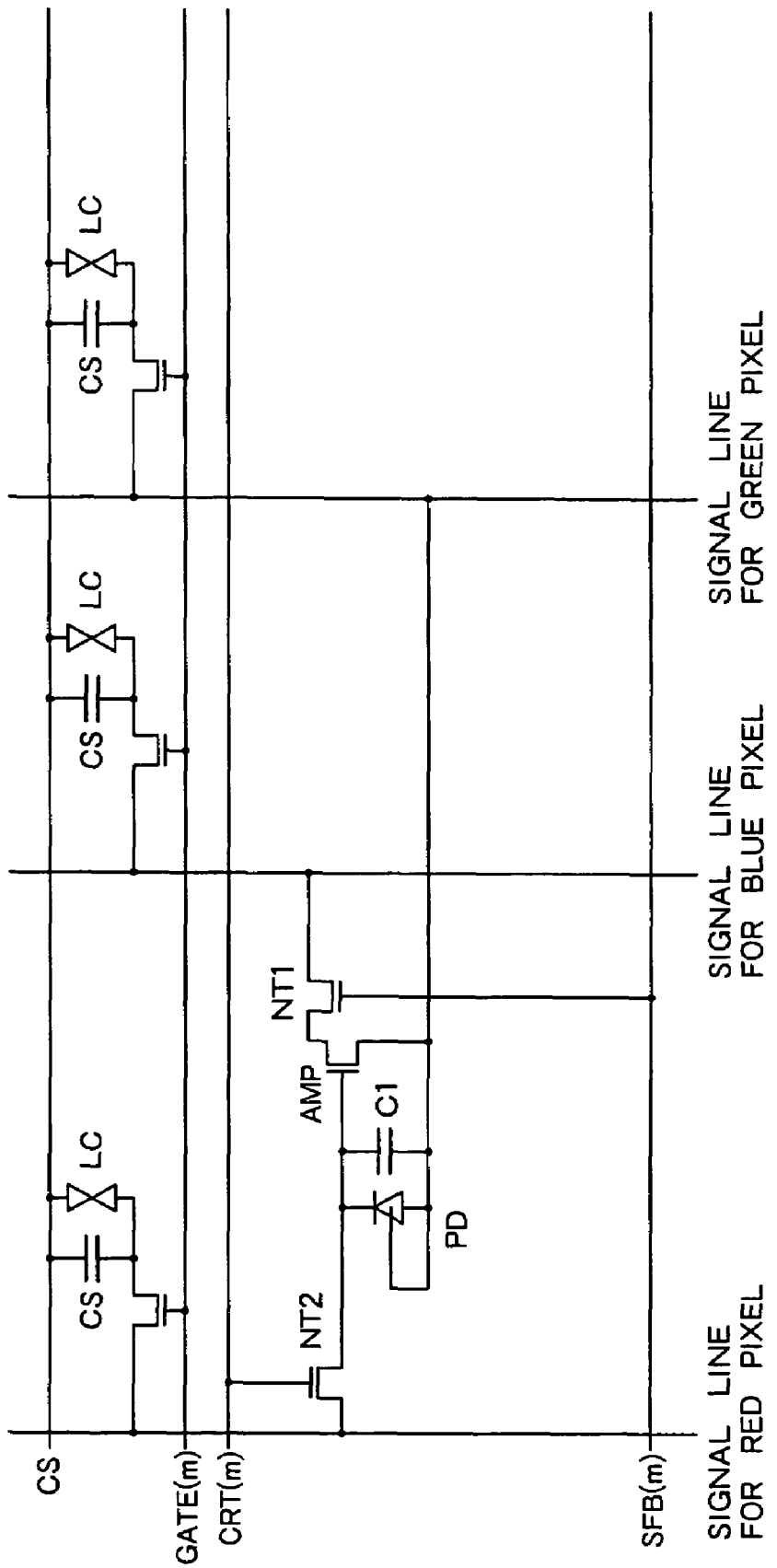
F I G. 31

DISPLAY DEVICE

CROSS REFERENCE TO RELATED APPLICATIONS

This application claims benefit of priority under 35 USC §119 to Japanese Patent Application No. 2003-373237, filed on Oct. 31, 2003, the entire contents of which are incorporated by reference herein.

BACKGROUND OF THE INVENTION

1. Field of the Invention

The present invention relates to a display device having an image capture function.

2. Related Art

A liquid display device has an array substrate provided with signal lines, scanning lines and pixel thin film transistors (TFTs), and drive circuits that drive the signal lines and the scanning lines. Along with recent advancement and development of integrated circuit technology, a process technique of forming a part of the drive circuit on the array substrate is put into practical use. Based on this technique, a liquid display device can be made thin and compact in total, and is widely used as a display device for various kinds of portable instruments such as portable telephones and laptop personal computers.

A display device having image capture function is proposed, in which closely arrayed area sensors (i.e., a photoelectric transfer element) are disposed on the array substrate (see for example, Japanese Patent Application Laid-open Nos. 2001-292276 and 2001-339640).

A conventional display device having this kind of image capture function changes a charge of a capacitor connected to a photoelectric transfer element according to the amount of light received by the photoelectric transfer element, and detects voltages at both ends of the capacitor, thereby capturing an image.

Recently, a technique of forming an image TFT and a drive circuit onto the same glass substrate according to a polycrystalline silicon (i.e., polysilicon) process is developed. The photoelectric transfer element can be also formed onto each pixel easily according to the polysilicon process.

When a display element and a photoelectric transfer element are incorporated into the pixel of the display device, the number of control lines to control the display elements and the photoelectric transfer elements increases, thereby lowering an aperture ratio. When the number of control lines increases, the area of the control circuit connected to the control lines also increases, resulting in an increase in the frame area of the array substrate.

SUMMARY OF THE INVENTION

In order to solve the above-described problems, an object of the present invention is to provide a display device of which frame can be made small without lowering an aperture ratio even when a photoelectric transfer element is incorporated into a pixel.

A display device according to one embodiment of the present invention, comprising:

display elements provided inside of pixels formed in vicinity of signal lines and scanning lines aligned in matrix form;

a plurality of image capture circuits, each capturing image at a certain range of a subject, and being provided one for every multiple pixels;

a scanning line drive circuit which drives the scanning lines;

a signal line drive circuit which drives the signal lines;

a pixel voltage supply control circuit which controls whether or not to supply a pixel voltage to the corresponding signal line; and a pre-charge voltage supply control circuit which controls whether or not to supply a pre-charge voltage capable of changing voltage level for each signal line to the corresponding signal line.

Furthermore, a display device according to one embodiment of the present invention, comprising:

display elements provided inside of pixels formed in vicinity of signal lines and scanning lines aligned in matrix form;

a plurality of image capture circuits, each capturing image at a certain range of a subject;

a first control line which control on/off of said display elements; and a scanning line drive circuit which drives the scanning lines, wherein each of said image capture circuits includes:

a sensor element which converts an external input into an electric signal; and at least one of a second control line which controls operation of said sensor circuit, wherein said scanning line drive circuit includes:

a shift register which has register circuits at a plurality of stages which shift a pulse signal with a prescribed pulse width in sync with pixel display timing; and a supply control circuit which controls a plurality of control signal lines based on the output signals of said shift register.

Furthermore, a display device according to one embodiment of the present invention, comprising:

display elements provided inside of pixels formed in vicinity of signal lines and scanning lines aligned in matrix form;

a plurality of image capture circuits, each capturing image at a certain range of a subject;

a level shift circuit which converts output level of said image capture circuit; and a serial/parallel conversion circuit which converts a signal converted by said level shift circuit into a serial signal;

wherein said level shift circuit includes:

a high speed read-out part which outputs a voltage in accordance with whether or not the output voltage of said image capture circuit is high or low, as compared with a reference voltage; and a low consumption power part which outputs the output voltage of said image capture circuit without converting level.

Furthermore, a display device according to one embodiment of the present invention, comprising:

display elements provided inside of pixels formed in vicinity of signal lines and scanning lines aligned in matrix form; and a plurality of image capture circuits, each capturing image at a certain range of a subject, wherein each of said plurality of image capture circuits includes:

a photoelectric conversion element which performs photoelectric conversion;

a capacitor which accumulates electric charge obtained by photoelectric conversion by said photoelectric conversion element;

a pre-charge circuit which switches whether or not to accumulate initial electric charge to said capacitor;

an amplifier which amplifies a voltage at both ends of said capacitor; and an output control circuit which switches whether or not to supply the output of said amplifier to the corresponding signal line, wherein said amplifier has one inverter for reversely amplifying a voltage at both ends of said capacitor.

Furthermore, a display device according to one embodiment of the present invention, comprising:

display elements provided inside of pixels formed in vicinity of signal lines and scanning lines aligned in matrix form;

a plurality of image capture circuits, each capturing image at a certain range of a subject; and supplementary capacitors for accumulating image electrode connected to said display elements, wherein each of said image capture circuit includes:

a photoelectric conversion element which conducts photoelectric conversion;

a capacitor which accumulates electric charge obtained by the photoelectric conversion by said photoelectric conversion element;

an amplifier which amplifies a voltage at both ends of said capacitor;

an output control circuit which switches whether or not to supply output of said amplifier to the corresponding signal line; and an accumulation control circuit which controls to periodically accumulate electric charge in accordance with the output of said amplifier or an internal signal in said amplifier, to said supplementary capacitor.

Furthermore, a display device according to one embodiment of the present invention, comprising:

display elements provided inside of pixels formed in vicinity of signal lines and scanning lines aligned in matrix form;

a plurality of image capture circuits, each capturing image at a certain range of a subject; and wherein each of said image capture circuits includes:

a photoelectric conversion element which conducts photoelectric conversion;

a capacitor which accumulates electric charge obtained by photoelectric conversion by said photoelectric conversion element;

a pre-charge circuit which switches whether or not to accumulate initial electric charge to said capacitor; and an amplifier which amplifies a voltage at both ends of said capacitor, wherein output of said amplifier is supplied to a neighboring pixel.

Furthermore, a display device, comprising:

display elements provided inside of pixels formed in vicinity of signal lines and scanning lines aligned in matrix form; and a plurality of image capture circuits provided one for every a plurality of pixels, each conducting photoelectric conversion;

wherein an input terminal of said image capture circuit is supplied with a prescribed voltage at a prescribed timing via the signal lines;

a ground terminal of said image capture circuit is supplied with a prescribed voltage at a prescribed timing via the signal lines; and each of the image capture circuits outputs the signal via the signal line at a prescribed timing.

BRIEF DESCRIPTION OF THE DRAWINGS

FIG. 2 is a circuit diagram showing one example of internal configuration of a pixel circuit.

FIG. 3 is a layout view of a pixel circuit of FIG. 2.

FIG. 5 is a circuit diagram showing one example of internal configuration of a level shifter.

FIG. 6 is a circuit diagram showing one example of internal configuration of a signal distribution circuit.

FIG. 13 is a layout diagram when a light-shielding layer made of the same metal is formed in a step of forming a metal layer for wiring.

FIG. 14 is an A-A' line cross sectional view of FIG. 13.

FIG. 15 is a diagram forming a wiring layer to a frame of array substrate.

FIG. 16 is an A-A' line cross sectional view of FIG. 15.

FIG. 17 is a circuit diagram corresponding to a layout diagram of FIG. 15.

FIG. 18 is a circuit diagram of omitting an NMOS transistor from FIG. 17.

FIG. 19 is a circuit diagram adding an NMOS transistor to a circuit of FIG. 17.

FIG. 20 is a circuit diagram showing an example of peripheral configuration of an image capture sensor that sequentially transfers image data to a downward direction of the screen.

FIG. 22 is a block diagram showing one example of internal configuration of a P/S converter.

FIG. 23 is a circuit diagram showing one example of internal configuration of a level shifter.

FIG. 31 is a circuit diagram showing a modified example of a pixel circuit.

DETAILED DESCRIPTION OF THE INVENTION

Figure 1:
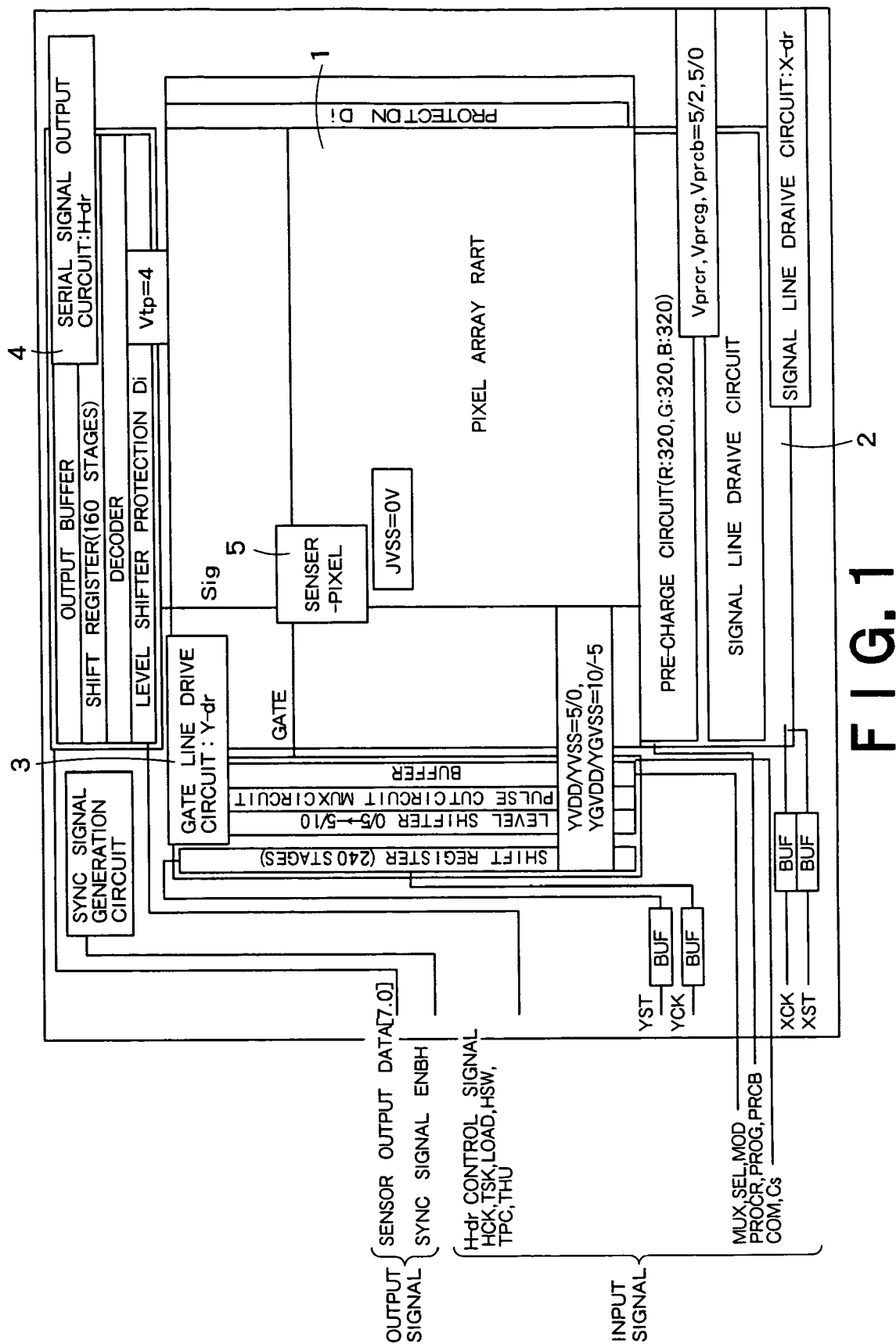
FIG. 1 is a block diagram showing one example of schematic configuration of a display device of the present invention.

FIG. 1 is a block diagram of schematic configuration according to a display device of the present invention, indicating particularly a configuration of circuits on an array substrate. The display device shown in FIG. 1 includes a pixel array part 1 disposed with signal lines and scanning lines, and having an image capture function, a signal line drive circuit 2 that drives the signal lines, a gate line drive circuit 3 that drives the scanning lines, and a serial signal output circuit 4 that serially outputs a result of capturing an image. These circuits are formed on a glass array substrate using a polysilicon TFT, for example.

The pixel array part 1 has plural pixel circuits 5 disposed in a matrix. Each pixel circuit 5 has a pixel TFT for display, and an image capture sensor to capture an image.

FIG. 2 is a circuit diagram showing an example of internal configuration of the pixel circuit 5. This circuit is provided for each pixel. The pixel circuit 5 shown in FIG. 2 includes a pixel TFT 6 that is driven by a signal from a gate line and one end of which is connected to the signal line, an auxiliary capacity Cs and a liquid crystal capacity LC that are connected to the other end of the pixel TFT 6, a photodiode PD that captures an image, a sensor capacity C1 that accumulates a charge corresponding to an image captured by the photodiode PD, an amplifier AMP that is connected to one end of the sensor capacity C1, a transistor NT1 that is driven by a signal from a control line SFB and that switches whether to supply an output from the amplifier AMP to the signal line, and a transistor NT2 for a pre-charger that is driven by a signal from the control line CRT.

The sensor capacity C1, the amplifier AMP, and the transistors NT1 and NT2 constitute the image capture sensor.

FIG. 3 is a layout diagram of the pixel circuit 5 shown in FIG. 2. As shown in FIG. 3, pixels are disposed in the order of a blue pixel, a green pixel, and a red pixel. These three color pixels share one image capture sensor 7. Alternatively, the image capture sensor 7 can be provided for each color.

Figure 4:
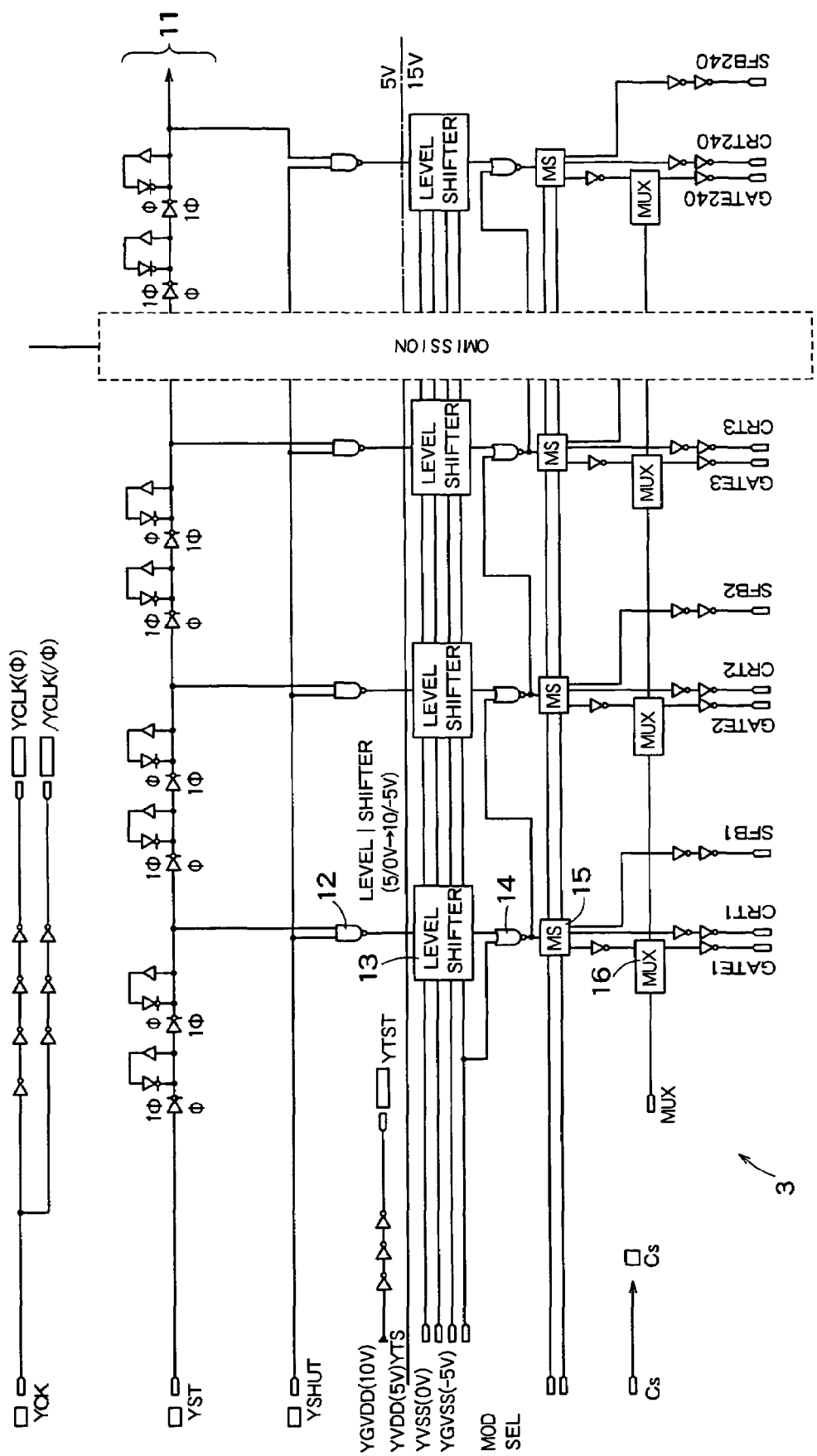
FIG. 4 is a circuit diagram showing one example of internal configuration of a gate line drive circuit of FIG. 1.

FIG. 4 is a circuit diagram showing an example of internal configuration of the gate line drive circuit 3 shown in FIG. 1. The gate line drive circuit 3 shown in FIG. 4 includes a shift register 11, a NAND gate 12 connected to an output terminal of each stage of the shift register 11, a level shifter 13 connected to an output terminal of the NAND gate 12, an NOR gate 14 connected to an output terminal of the level shifter 13, a signal allocate circuit (MS) 15 connected to an output terminal of the NOR gate 14, and an H switch circuit (MUX) 16 that switches whether to set all gate lines to a high level.

The level shifter 13 converts an output voltage of the shift register 11 from 5/0V to 10/−5V. FIG. 5 is a circuit diagram showing an example of internal configuration of the shift register 13. The shift register 13 shown in FIG. 5 includes PMOS transistors Q1 and Q2 that are cross-connected, a PMOS transistor Q3 and an NMOS transistor Q4 that are connected in cascade between a drain terminal of the PMOS transistor Q1 and a ground terminal, a PMOS transistor Q5 and an NMOS transistor Q6 that are connected in cascade between a drain terminal of the PMOS transistor Q2 and a ground terminal, a PMOS transistor Q7 and an NMOS transistor Q8 that constitute an inverter which inverts an input signal IN, a PMOS transistor Q9, an NMOS transistor Q10, and an NMOS transistor Q11 that are connected in cascade between two power source terminals YGVDD and YGVSS, and a PMOS transistor Q12, an NMOS transistor Q13, and an NMOS transistor Q14 that are connected in cascade between the power source terminals YGVDD and YGVSS.

The input signal IN is input to between both gate terminals of the PMOS transistor Q3 and the NMOS transistor Q4. The input signal IN is inverted by the PMOS transistor Q7 and the NMOS transistor Q8. The inverted input signal IN is input to both gate terminals of the PMOS transistor Q5 and the NMOS transistor Q6. A connection node A between the PMOS transistor Q5 and the NMOS transistor Q6 is input to a gate terminal of the PMOS transistor Q1. A connection node B between the PMOS transistor Q3 and the NMOS transistor Q4 is input to a gate terminal of the PMOS transistor Q2.

The signal allocate circuit 15 generates control signals GATE, CRT, and SFD within the pixel circuit 5 shown in FIG. 3. FIG. 6 is a circuit diagram showing an example of internal configuration of the signal allocate circuit 15. The signal allocate circuit 15 shown in FIG. 6 includes a three-input NOR gate 21 that outputs the control signal GATE, a three-input NOR gate 22 that outputs the control signal CRT, and a three-input NOR gate 23 that outputs the control signal SFB.

Figures 7, 8:
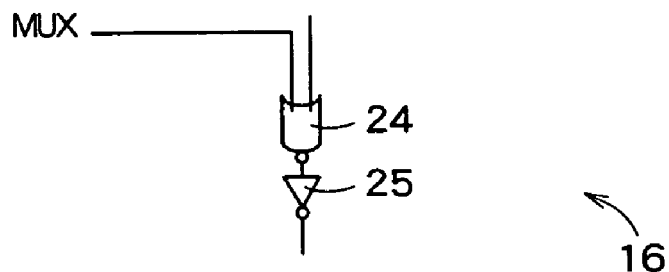
FIG. 7 is a logic diagram of input/output signal of a signal distribution circuit of FIG. 6.
FIG. 8 is a circuit diagram showing one example of internal configuration of H switch circuit.

FIG. 7 is a logic diagram of input and output signals of the signal allocate circuit 15 shown in FIG. 6. As shown in FIG. 7, a signal INPUT that is output from the NOR gate 14 is output to the control signals GATE, CRT, and SFB by switching, according to a logic of external control signals MOD and SEL.

FIG. 8 is a circuit diagram showing an example of internal configuration of the H switch circuit 16. The H switch circuit 16 shown in FIG. 8 includes an NOR gate 24 and an inverter 25. When a control signal MUX that is input to one end of the NOR gate 24 is set to a high level, all the gate lines become at a high level.

Figure 9:
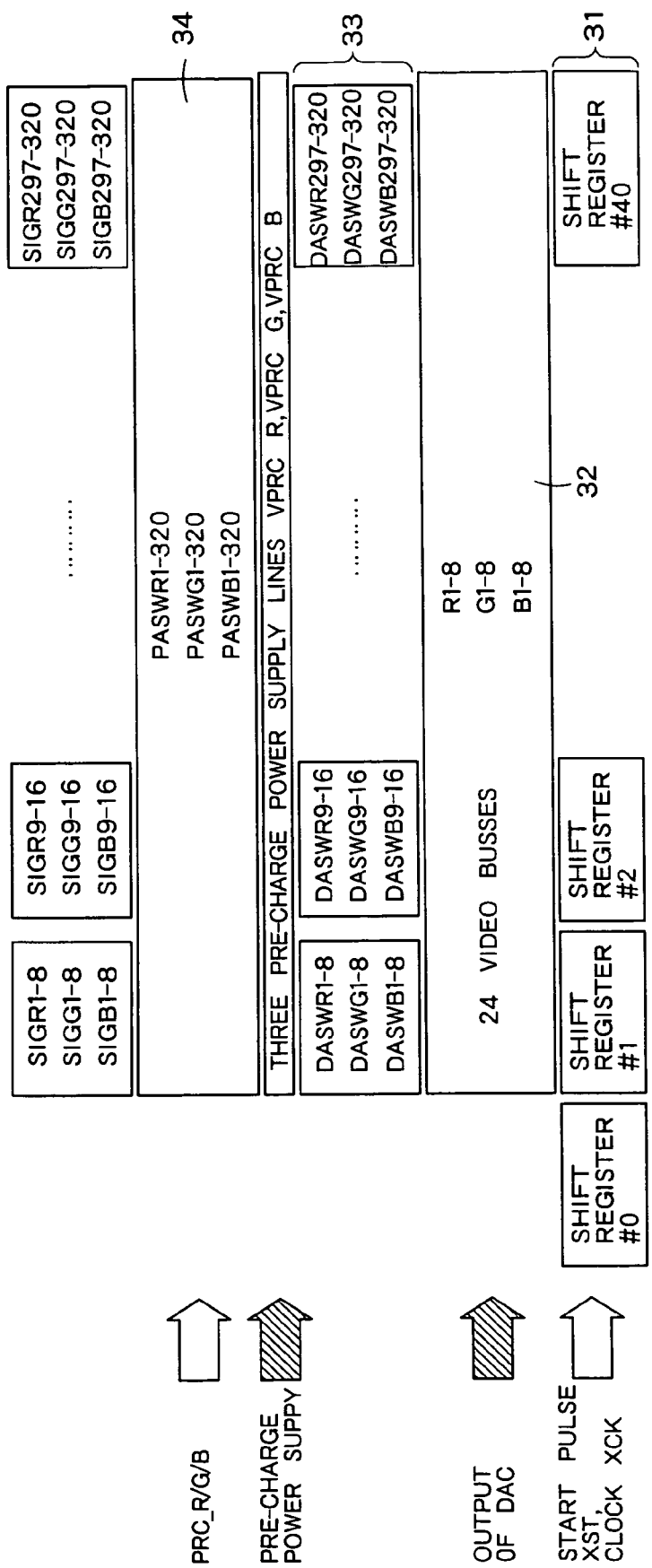
FIG. 9 is a block diagram showing one example of internal configuration of a signal line drive circuit of FIG. 1.

FIG. 9 is a block diagram showing an example of internal configuration of the signal line drive circuit 2 shown in FIG. 1. The signal line drive circuit 2 shown in FIG. 9 includes a shift register 31 that outputs a shift pulse obtained by shifting a start pulse, 24 video buses 32, including eight buses for each color, that supply an analog pixel voltage obtained by D/A converting digital data with a digital/analog converter (DAC) not shown, vide data switch control circuits 33 that switch control whether to supply analog pixel voltages on the video buses 32 to corresponding signal lines, and a pre-charge circuit 34 that controls whether to supply predetermined pre-charge voltages to corresponding signal lines.

The DAC is a circuit that converts digital pixel data into analog voltage suitable for liquid crystal drive, and this circuit can be formed onto a glass substrate according to a low-temperature polysilicon TFT technique, or can be formed as an IC chip separate from the glass substrate. According to the present embodiment, a range of voltage output from the DAC is from 0.5V to 4.5V, for example. An opposite voltage Vcom that is applied to a transparent common electrode of the opposite substrate depends on polarity, such as 0V (positive polarity) or 5V (negative polarity), for example. This opposite voltage Vcom is a standard voltage to drive a normal twisted nematic liquid crystal. The range of voltage output from the DAC is usually smaller than a range of power source voltage (Vdd, GND) supplied to the DAC by about 0.2 to 0.5V.

Figure 10:
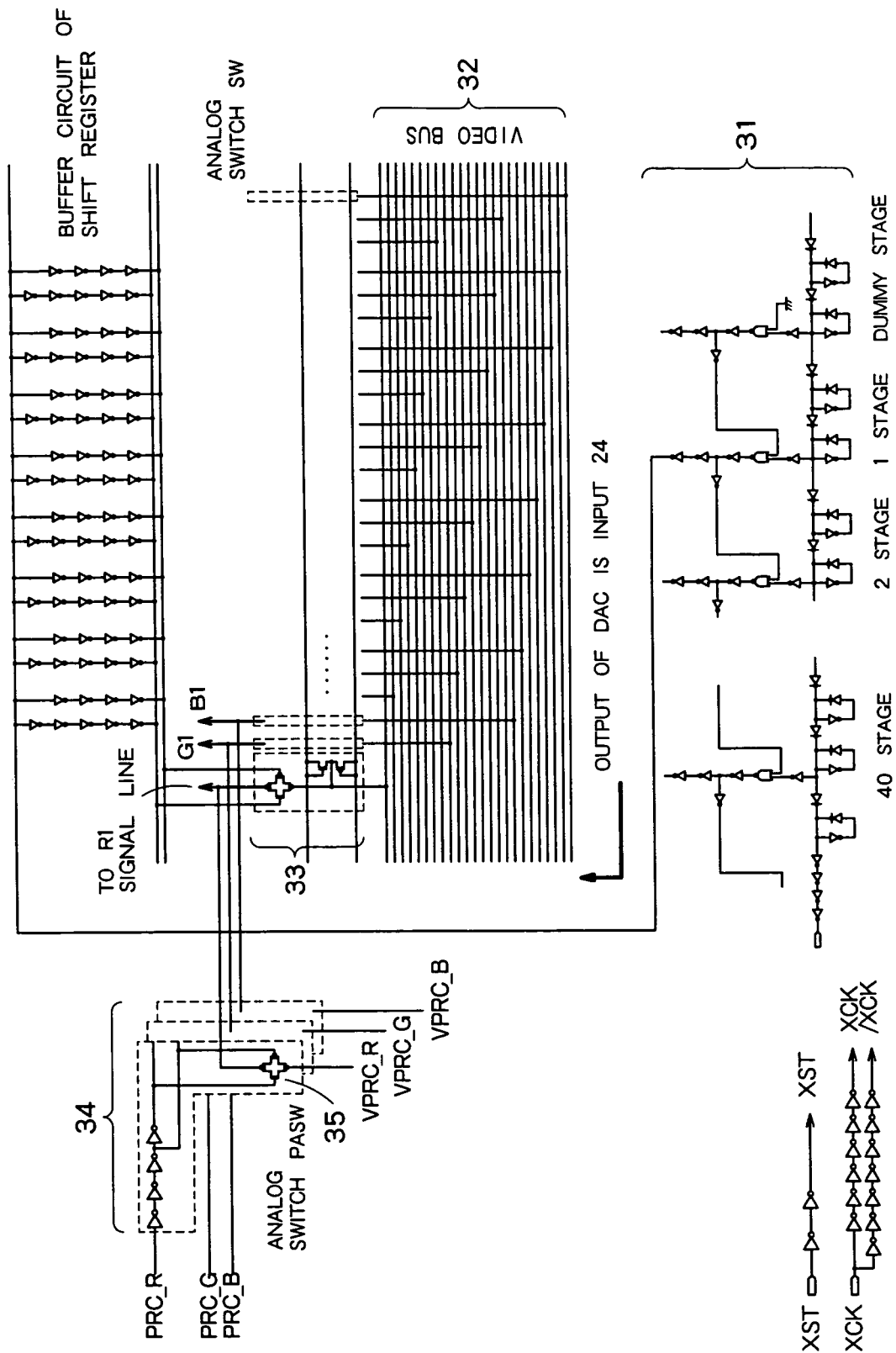
FIG. 10 is a circuit diagram corresponding to that of FIG. 9.

FIG. 10 is a circuit diagram showing an example of the signal line drive circuit 2 shown in FIG. 9. An output from the video data switch control circuit 33 and an output from the corresponding pre-charge circuit 34 are wired OR. The pre-charge circuit 34 for red switch controls whether to supply a pre-charge voltage VPRC_R to a corresponding signal line. The pre-charge circuit 34 for green switch controls whether to supply a pre-charge voltage VPRC_G to a corresponding signal line. The pre-charge circuit 34 for blue switch controls whether to supply a pre-charge voltage VPRC_B to a corresponding signal line.

To supply individual pre-charge voltages for respective colors to corresponding signal lines as described above is a characteristic not found conventionally. Conventionally, a signal line pre-charge circuit of a liquid crystal display device generally supplies one common voltage to all the signal lines.

The video data switch control circuits 33 for red, green, and blue for eight pixels, respectively are all turned on simultaneously. For example, a first stage output of the shift register 31 is connected, via a buffer circuit, to control terminals of the video data switch control circuits 33 of video data including eight pixels, respectively of R1 to R8, G1 to G8, and B1 to B8 shown in FIG. 10. These video data switch control circuits 33 are turned on or turned off simultaneously.

Figure 11:
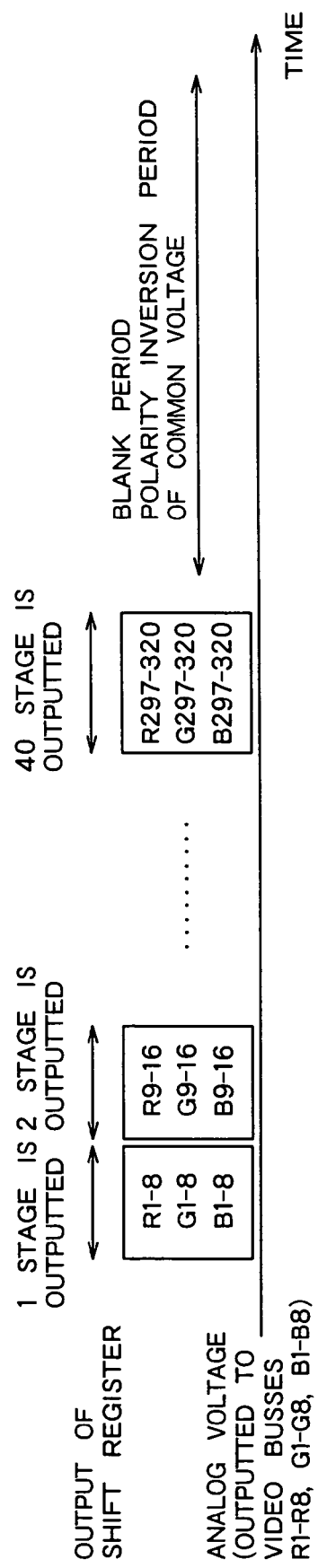
FIG. 11 is a timing diagram showing the order of writing signal lines by a signal line drive circuit.

FIG. 11 is a timing diagram of the order of writing signal lines by the signal line drive circuit 2. As shown in FIG. 11, the pixel data of R1 to R8, G1 to G8, and B1 to B8 are first written into corresponding signal lines. Next, pixel data of R9 to R16, G9 to G16, and B9 to B16 are written into corresponding signal lines. Pixel data are written in this order. Lastly, pixel data of R297 to R320, G297 to G320, and B290 to B320 are written into corresponding signal lines. In other words, pixel data of each eight pixels are written into signal lines at the same timing. After this, a blank period continues. During this blank period, polarity of the common voltage is reversed. Thereafter, a similar operation is repeated.

Figure 12:
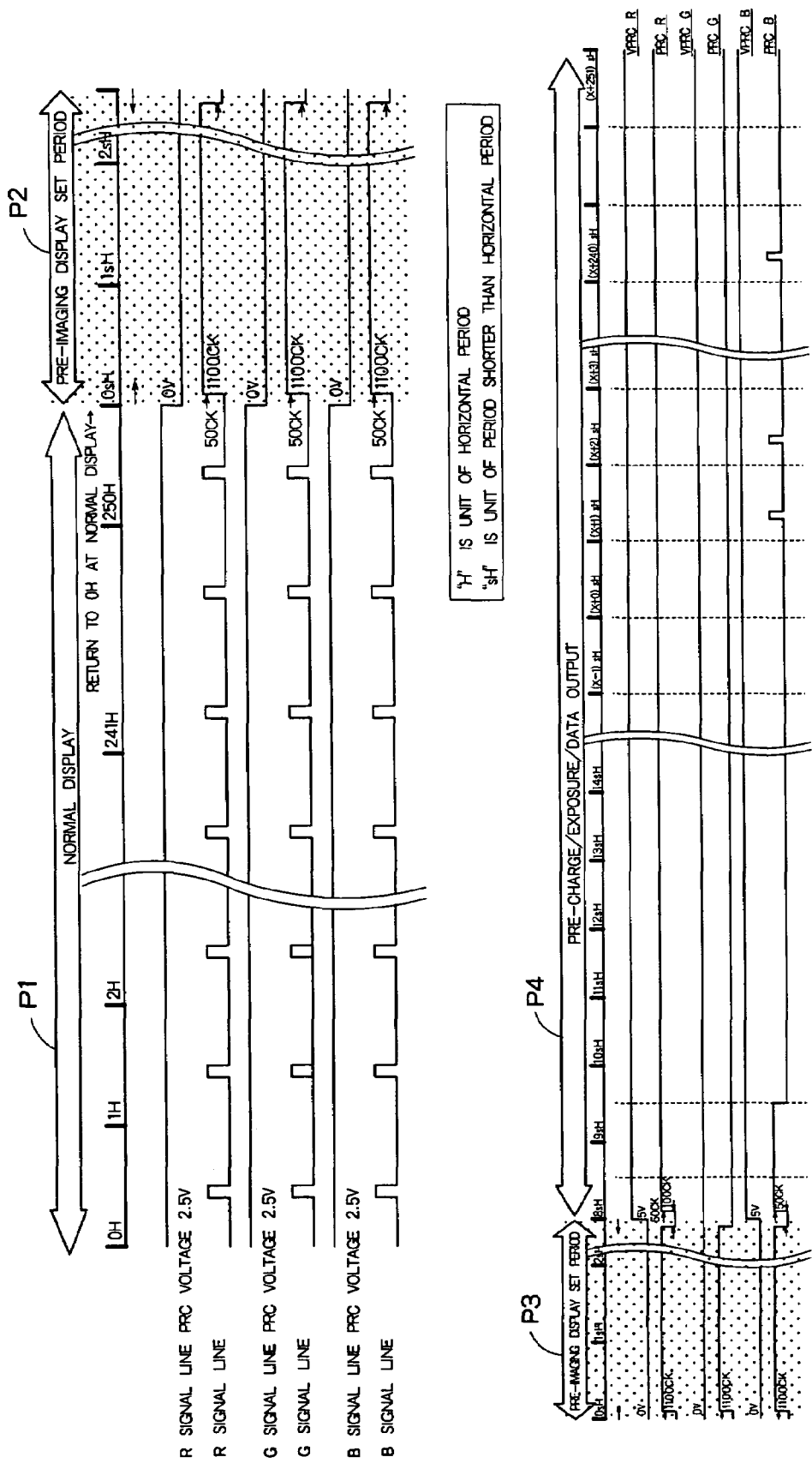
FIG. 12 is a diagram showing a relationship between pre-charge voltages and a control terminal of an analog switch.

FIG. 12 is a diagram showing a relationship between the pre-charge voltages VPRC_R, VPRC_G, and VPRC_B that are supplied to one end of an analog switch 35 within the pre-charge circuit 34, and the logic of control terminals PRC_R, PRC_G, and PRC_B of the analog switch 35.

As shown in FIG. 12, during a normal display period p1, when the polarities of Vcom and Vcs are reversed, the analog switch 35 is kept on for only a short period, and all signal lines are pre-charged to an intermediate potential 2.5V. With this arrangement, at the time of the reversal of polarities, the signal line potential is prevented from being changed extremely due to a coupling with the transparent electrode of the opposite substrate. During pre-imaging display set periods p2 and p3, the common electrode potential is set to 0V, and all signal lines are pre-charged to 0V. At the same time, gate lines Gates 1 to 240 of all rows are at the H level. Based on this, the whole screen is displayed white. Because the common electrode potential and the pixel electrode potential are at 0V, a voltage applied to the liquid crystal layer becomes 0V. Transmittance of white becomes higher than that for the normal display, and light utilization efficiency for imaging becomes advantageous. This shows an example in the case of using a twisted nematic liquid crystal at normally white mode. Even in the case of normally black mode and the case of using the other liquid crystal materials and display mode, if the pre-charge circuit supplies a voltage outside output range of the DAC at normal display time, higher brightness than that at ordinary display time are obtained.

During the normal display, a pixel voltage becomes 0.8V when Vcom=0V, and 0.8V is applied to the liquid crystal layer. Therefore, strictly speaking, transmission is lost to some extent. This depends on a constraint of a range of output from the DAC. From this viewpoint, it is advantageous to use the pre-charge circuit instead of the DAC for the pre-imaging display setting.

In order to read only a specific color component (red portion, for example) of an imaged subject, a pre-charge voltage to a green signal line and a blue signal line is set to 5V. Based on this, the display can be set to red. Chromaticity of red color becomes higher than that at normal display time. The reason is that brightness of red increases, and the brightness of green and blue pixels becomes low. When the voltage outside the output range of the DAC at normal display time is applied from the pre-charge circuit, red with color reproduction range broader than that at normal display time can be displayed. Among the backlight components, only the red component mainly reaches the imaged subject, and a reflection light enters an optical sensor. Other lights are shielded with a liquid crystal cell. During an imaging period (i.e., pre-charge/exposure/data output period) p4, the pre-charge voltages VPRC_R, VPRC_G, and VPRC_B are set to respective pre-determined voltages (5V, 0V, and 4V, in the case of FIG. 4).

As explained above, because the pre-charge voltages VPRC_R, VPRC_G, and VPRC_B can be set separately during the imaging period, the image quality of the picked-up image improves.

Below the photodiode PD that carries out a photoelectric conversion, a light-shielding layer is provided to prevent the light of the backlight from being incident to the photodiode PD. This light-shielding layer can be formed with a resin or the like. Alternatively, the light-shielding layer can be formed using a metal layer at the stage of forming the metal layer for wiring.

FIG. 13 is a layout diagram of a circuit having a light-shielding layer 44 formed below the photodiode PD at the step of forming a metal layer for wiring, the light-shielding layer 44 being made of the same metal as that of the metal layer. FIG. 14 is a cross-sectional diagram of the circuit shown in FIG. 13 cut along a line A-A'. In FIG. 14, an array substrate 41 includes a passivation film 43 formed on a gate insulation film 42, the light-shielding layer 44 formed on the passivation film 43, and a transparent resin layer 45 formed on the light-shielding layer 44. The photodiode PD is formed inside the gate insulation film 42.

The light-shielding layer 44 is formed at the same step as that of forming the metal layer for wiring. A metal layer for wiring (hereinafter, a wiring layer) 46 is formed on a frame portion of the array substrate as shown in FIG. 15. FIG. 16 is a cross-sectional diagram of the circuit shown in FIG. 15 cut along a line A-A'. As shown in FIG. 16, the wiring layer 46 has a two-layer structure, of which resistance can be lowered.

When the light-shielding layer 44 is formed using the wiring layer 46 as shown in FIG. 13, the wiring layer 46 and the light-shielding layer 44 can be formed at the same step, thereby simplifying the manufacturing process.

FIG. 17 is a circuit diagram showing one example of the layout shown in FIG. 15. As shown in FIG. 17, the amplifier AMP having two-stage inverters is provided at a latter stage of the sensor capacity C1 that accumulates a charge obtained by photoelectric conversion by the photodiode PD. An NMOS transistor 51 that constitutes a first-stage inverter within the amplifier AMP can be omitted.

FIG. 18 is a circuit diagram showing an example that the NMOS transistor 51 is omitted from the configuration shown in FIG. 17. According to the circuit shown in FIG. 18, a charge corresponding to a voltage of 5V, for example, is pre-charged to the sensor capacity C1. The photodiode PD starts capturing an image in this state. When there is little light that is incident to the photodiode PD, the charge accumulated in the sensor capacity C1 is discharged (i.e., leaks) little. In this case, the output from the amplifier AMP consisting of the inverter becomes at a low level. Thereafter, the control voltages SFB and CRT become at a high level, the transistors NT1 and NT2 become conductive, and the PMOS transistor 52 is turned on. As a result, a power source voltage JVDD is applied to both ends of the sensor capacity C1, thereby refreshing the sensor capacity C1.

On the other hand, when there is much light that is incident to the photodiode PD, the sensor capacity C1 discharges, and voltages at both ends of the sensor capacity C1 are lowered. As a result, the output from the amplifier AMP having the inverter becomes at a high level (such as 4V, for example).

To read the accumulated charge from the sensor capacity C1, the transistors NT1 and NT3 are turned on, and signals corresponding to the accumulated charge in the sensor capacity C1 are supplied to signal lines.

FIG. 19 is a circuit diagram having an NMOS transistor NT5 added to the circuit shown in FIG. 17. The NMOS transistor NT5 is controlled according to a control signal JPOL. One end of this transistor is connected to a connection node between the pixel TFT 6 and the transistors NT2 and NT3, and the other end of the transistor is connected to a connection node A between inverters IV1 and IV2 within the amplifier AMP.

Based on the provision of the NMOS transistor NT5, the amplifier AMP can be utilized to hold a pixel voltage, thereby lowering power consumption when a still image is kept displayed.

According to the circuit shown in FIG. 19, when the voltage of the auxiliary capacity Cs is 0V (positive polarity), the output voltage of the amplifier AMP is written into the auxiliary capacity Cs by conducting the transistor NT1 and the transistor 6. When the voltage of the auxiliary capacity Cs is 5V (negative polarity), the output voltage of the amplifier AMP is written into the auxiliary capacity Cs by conducting the transistor NT5 and the transistor 6.

As explained above, based on the provision of the transistor NT5, voltage of reverse polarity can be written into the auxiliary capacity Cs from the amplifier AMP in a predetermined cycle. If the transistor NT5 is not present, only data in the output polarity of the amplifier AMP can be always written. Accordingly, data in the same polarity is continuously written into the liquid crystal layer, which degrades the liquid crystal molecule and loses reliability. This problem can be avoided based on the provision of the transistor NT5.

The above image capture sensor 7 supplies captured image data to signal lines. However, this increases drive load of the signal lines. Further, time of writing image data to signal lines is short. Therefore, it is difficult to increase the screen size or increase the resolution. To solve these problems, instead of supplying image data to signal lines, the image data may be sequentially transferred between adjacent pixels.

FIG. 20 is a circuit diagram showing an example of peripheral configuration of the image capture sensor 7 that sequentially transfers image data to a downward direction of the screen, illustrating an example of transferring image data from bottom up. The image data transfer direction is not limited to a downward direction, and can be an upward direction or a lateral direction.

The circuit shown in FIG. 20 excludes inverters and transistors from the circuit shown in FIG. 17. Outputs from the inverters are supplied to a connection node between transistors of adjacent pixels.

According to the circuit shown in FIG. 20, image data is not supplied to signal lines of large load but is supplied to adjacent pixels of small load. Therefore, it is not necessary to provide the amplifier AMP for each one pixel at the latter stage of the sensor capacity C1. Consequently, the number of transistors can be decreased. Because the load is small, the image data can be transferred at a high speed, and power consumption can be also decreased.

Figure 21:
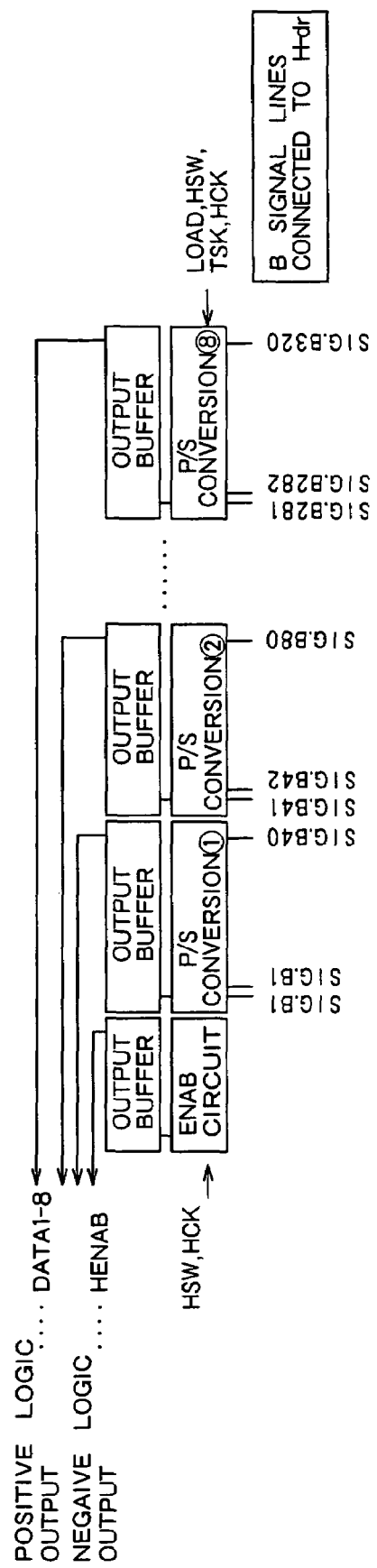
FIG. 21 is a block diagram showing one example of internal configuration of a serial signal output circuit of FIG. 1.

FIG. 21 is a block diagram showing an example of internal configuration of the serial signal output circuit 4 shown in FIG. 1. The serial signal output circuit 4 shown in FIG. 21 includes plural P/S converters 61, an ENAB circuit 62 that is used to detect a data position at the outside of an array substrate, and an output buffer 63.

Each P/S converter 61 is connected with 320 signal lines, and serially outputs image data on these signal lines.

FIG. 22 is a block diagram showing an example of internal configuration of the P/S converter 61. The P/S converter 61 shown in FIG. 22 includes a level shifter 64, a latch circuit 65 that is connected to the output of the level shifter 64, a switch 66 that is connected to the output of the latch circuit 65, and a shift register 67 that is connected to a latter stage of the switch 66.

FIG. 23 is a circuit diagram showing an example of internal configuration of the level shifter 64. The level shifter shown in FIG. 23 includes a switch 71, a capacitor C2, an inverter 72, a switch 73, an inverter 74, and a switch 75 that are connected in series between an input terminal in and an output terminal out, a switch 76 that is connected to the input terminal and the output terminal, a switch 77 that is connected to the input terminal and the output terminal of the inverter 74, a switch 78 that is connected between a connection route between the switch 71 and the capacitor C2 and a power source terminal VTP, and a switch 79 that is connected between a connection route between the switch 73 and the inverter 74 and the ground terminal.

The level shifter 64 carries out different operations between a high-speed reading mode and a low-power-consumption reading mode. When the quantity of image data to be captured is large such as a color image, the high-speed reading mode is selected. When the quantity of image data to be captured is small such as a monochromatic image, the low-power-consumption reading mode is selected.

To carry out the high-speed reading, the control signal TPC is set to a high level, and the control signal THU is set to a low level, thereby pre-charging the capacity of the level shifter 64 to the capacitor C2. Next, the control signal TPC is set to a low level, and the control signal THU is set to a low level. With this arrangement, a high-level signal or a low-level signal is output, depending on whether a signal line voltage input to the level shifter 64 is higher than the power source voltage VTP (=4V). As explained above, during the high-speed reading, the level shifter 64 converts a voltage to that of large amplitude difference of 0V or 5V, even if a potential change in the signal line is small.

To carry out the low-power-consumption reading, the control signal TPC is set to a high level, and the control signal THU is set to a high level, thereby bypassing the level shifter 64, and outputting a signal line voltage as it is. In this case, data cannot be read until when the potential of a signal line makes a relatively large change of 5V or 0V. Therefore, the data reading speed becomes relatively slow. However, because no intermediate voltage is applied to the inverters or the like, power consumption is relatively small. During the low-power-consumption reading, power supply to the inverter 72 and the inverter 74 of the level shifter is interrupted (not shown).

During the normal display, the control signal TPC is set to a high level, and the control signal THU is set to a low level. In this case, no data is output.

Figure 24:
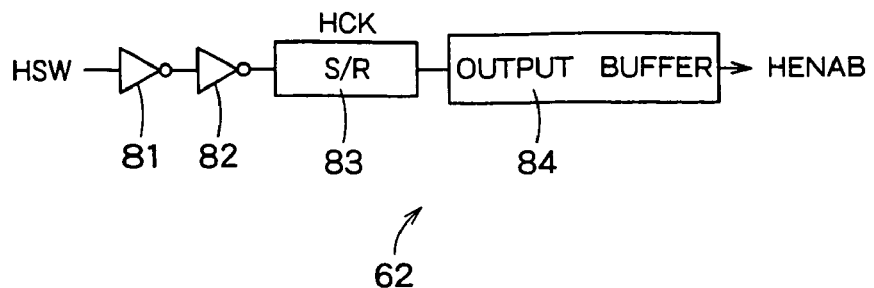
FIG. 24 is a circuit diagram showing one example of internal configuration of an ENAB circuit.

FIG. 24 is a circuit diagram showing an example of internal configuration of the ENAB circuit 62 within the serial signal output circuit 4 shown in FIG. 21. The ENB circuit 62 shown in FIG. 24 includes inverters 81 and 82 that are connected in cascade, a shift register 83, and an output buffer 84.

Figure 25:
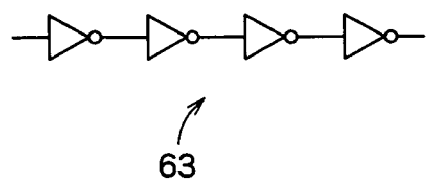
FIG. 25 is a circuit diagram showing one example of internal configuration of an output buffer.

FIG. 25 is a circuit diagram showing an example of internal configuration of the output buffer 63 within the ENAB circuit 62 shown in FIG. 24. The output buffer 63 shown in FIG. 25 includes plural inverters.

Figure 26:
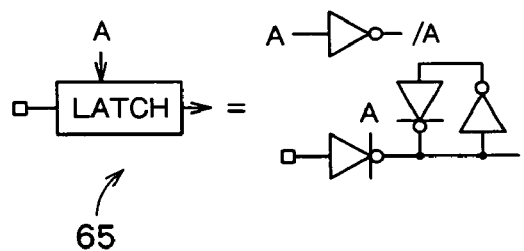
FIG. 26 is a circuit diagram showing one example of internal configuration of a latch circuit in a P/S converter.

FIG. 26 is a circuit diagram showing an example of internal configuration of a latch circuit within the P/S circuit 61 in the ENAB circuit 62 shown in FIG. 24. The latch circuit shown in FIG. 26 includes a clocked inverter and an inverter.

Figure 27:
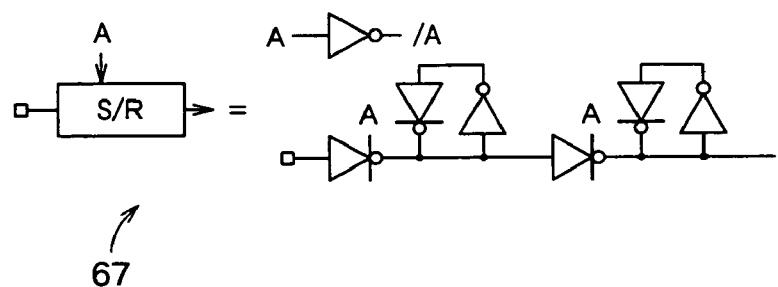
FIG. 27 is a circuit diagram showing one example of internal configuration of an S/R circuit in a P/S converter.

FIG. 27 is a circuit diagram showing an example of internal configuration of an S/R circuit within the P/S circuit 61 shown in FIG. 26. The S/R circuit shown in FIG. 27 includes a clocked inverter and an inverter.

Figure 28:
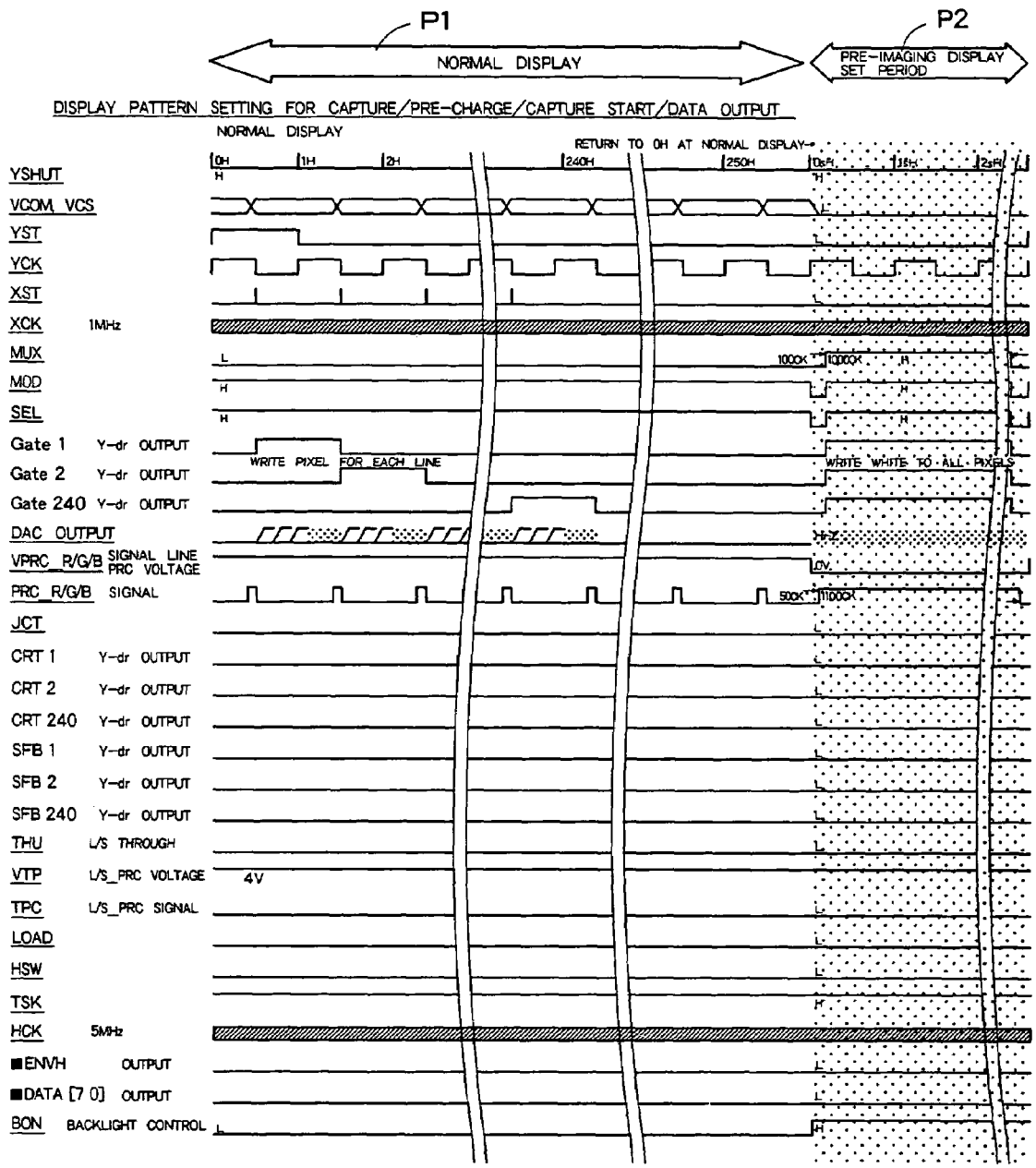
FIG. 28 is an operational timing diagram of a display device of FIG. 1.
Figure 29:
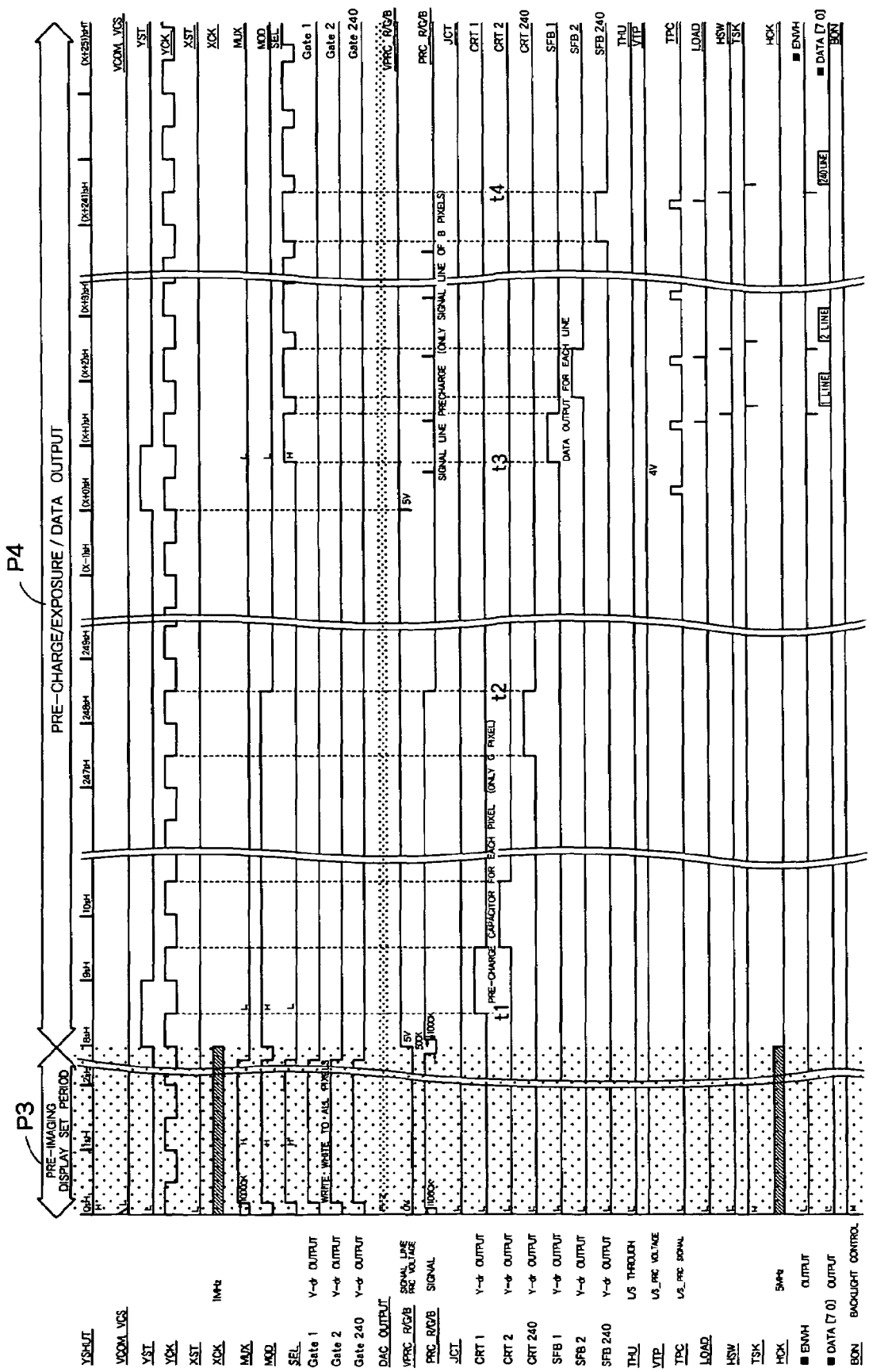
FIG. 29 is a diagram following to FIG. 28.

FIG. 28 and FIG. 29 are operation timing charts of the display device shown in FIG. 1. In FIG. 28, a period p1 denotes a normal display period. A period p2 in FIG. 28 and a period p3 in FIG. 29 dente pre-imaging display set periods, respectively. A period p4 in FIG. 29 denotes an operation timing of an image capture period (i.e., a pre-charge/exposure/data output period). For the sake of convenience, the period p2 in FIG. 28 and the period p3 in FIG. 29 are the same periods.

The operation during the normal display period p1 is explained. During the normal operation period p1, the control signals MUX, MOD, and SEL shown in FIG. 4 are set to L, H, and H, respectively. As a result, the shift pulse of the shift register 11 is sequentially output to gate lines Gates 1 to 240 in a row unit, and signal line potentials (0.5 to 4.5V) are sequentially accumulated for each row in the auxiliary capacity Cs.

The operation during the pre-imaging display set periods p2 and p3 will be explained hereinafter. During the pre-imaging display set periods p2 and p3, the control signals MUX, MOD, and SEL shown in FIG. 4 are set to H, H, and H, respectively. As a result, all the gate lines are set to a high level, and signal line potentials (0V or 5V) are accumulated simultaneously for all pixels into the auxiliary capacity Cs.

The operation during the image capture period p4 is explained. In FIG. 29, a period from time to t2 denotes a pre-charge period, and a period from time t3 to t4 denotes an exposure and image data output period. During the pre-charge period, the control signals MUX, MOD, and SEL are set to L, H, and L, respectively. As a result, the control lines CRT1 to 240 are driven sequentially, and pre-charge voltages (5V) are written for each row into the sensor capacity C1. During the exposure and image data output period, the control signals MUX and MOD are set to L and L, respectively, and the control signal SEL is set to H and L alternately. When the control signal SEL is at H, the control signal SFB is set to H for each row. The amplifier AMP within the pixels is connected to signal lines, and data read from the pixels are transferred to the serial signal output circuit 4. When the control signal SEL is at L, the signal lines are pre-charged to 5V so that the amplifier within the pixels consisting of a source follower operates normally.

Figure 30:
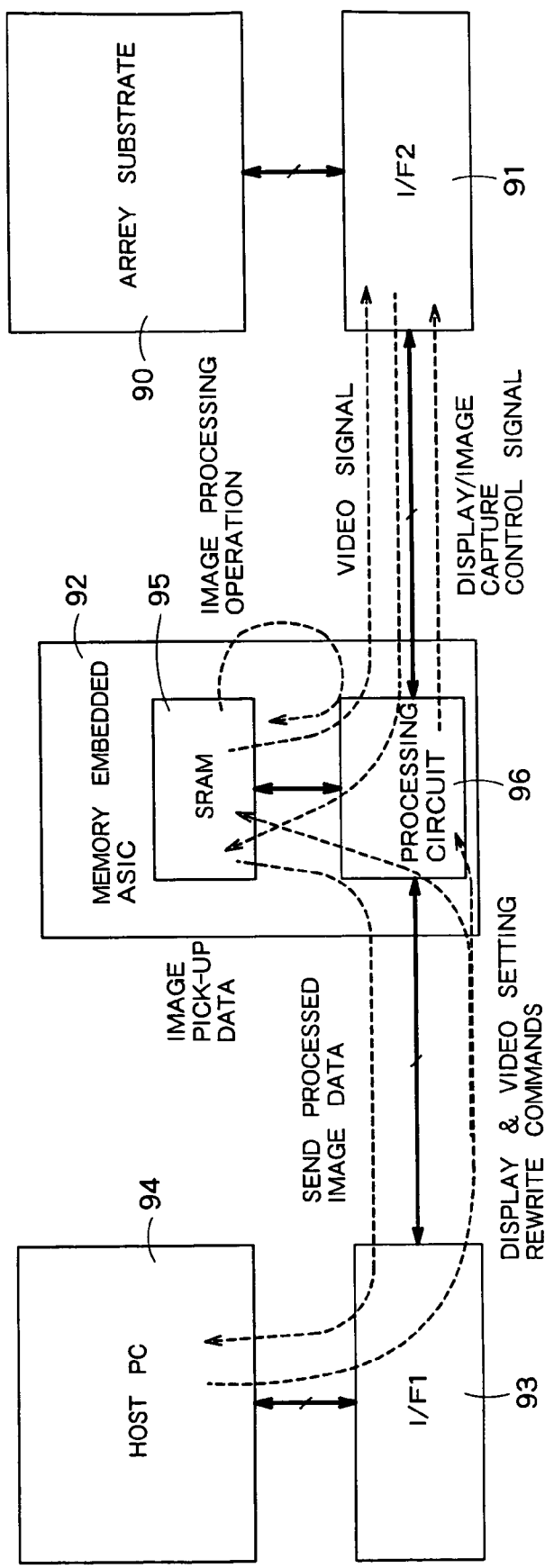
FIG. 30 is a schematic diagram showing a data flow and a signal flow of the display device according to the present embodiment.

FIG. 30 is a schematic diagram showing a data flow and a signal flow of the display device according to the present embodiment. An array substrate 90 is connected to a memory embedded application specific integrated circuit (ASIC) 92 via an interface (I/F2) 91. The ASIC 92 is connected to a host personal computer (PC) 94 via an interface (I/F1) 93. The memory embedded ASIC 92 has a static random access memory (SRAM) 95 and a processing circuit 96. The memory embedded ASIC 92 can be a field programmable gate array (FPGA).

The host PC 94 sends visual data for display and video setting rewrite commands to the memory embedded ASIC 92. The SRAM 95 stores the display data from the host PC 94, and the processing circuit 96 stores the video setting rewrite commands. The video data stored in the SRAM 95 is sent to the array substrate 90 via the interface 91. The processing circuit 96 sends a display/imaging control signal to the array substrate 90 via the interface 91. The image data picked up by the array substrate 90 is sent to the SRAM 95 via the interface 91. The processing circuit 96 performs image processing operation for the video data and the image data stored in the SRAM 95. The SRAM 95 sends the processed image data to the host PC 94 via the interface 93.

The processing circuit 96 can carry out the image processing by hardware or by software. While the display device sends a large amount of image data to the memory embedded ASIC 92, the memory embedded ASIC 92 sends only the processed image data to the host PC 94.

As can be understood from FIG. 30, all the various control signals, video signals, and image data are transferred between the memory embedded ASIC 92 and the array substrate 90 without passing through a central processing unit (CPU) bus. Therefore, the data transfer does not depend on congestion of the CPU bus, and the processing load of the CPU can be reduced.

Only the processed image data collection and the video setting rewrite commands are transferred via the CPU bus. Therefore, these data can be transferred slowly. Each time when one image is picked up, rearranging and addition can be carried out inside the ASIC. Therefore, the image processing time can be reduced substantially. Because the speed of the CPU bus can be slow, the cost of the total system can be reduced.

As described above, according to the present embodiment, only one shift register 11 is provided within the gate line drive circuit 33. The three kinds of control signals GATE, CRT, and SFB to control the pixel circuit 5 are generated by the output shift pulse from this shift register. Therefore, the configuration of the gate line drive circuit 33 can be simplified, and power consumption is reduced. Further, the frame area of the array substrate can be reduced.

The pre-charge circuit 34 that pre-charges the signal lines is provided in the signal line drive circuit 2. The pre-charge circuit 34 pre-charges respective signal lines at different pre-charge voltages depending on colors. Therefore, pre-charge voltages that are optimum to capture an image can be set.

The pixel circuit can have a configuration as shown in FIG. 31. A JVSS line is deleted from the circuit configuration shown in FIG. 2, and, instead, a green signal line is used as a ground line for the sensor and the capacity C1. By such constitution, the wirings dedicated to the ground line are unnecessary, the aperture ratio becomes high, and it is possible to save power consumption. According to the circuit shown in FIG. 31, the green signal line is pre-charged to 0V at the data output time. The above advantages can be obtained based on the provision of a pre-charge circuit for each color.

In the above embodiment, the example in which each pixel is provided with the photo sensor has been explained. However, according to the present invention, various kinds of sensors besides the photo sensor, such as capacitive sensor are available, if these sensors can convert an external input signal on the display into an electric signal.

In the above embodiment, the example in which the image pick-up subject such as document, picture and business card is put on the display to capture image has been explained. However, the present is applicable to a display device with touch panel function for detecting a location touched by finger and a display device with digitizer function for detecting a location touched by a light pen which has a light emission device on head of the pen.

What is claimed is:
1. A display device, comprising:
  display elements provided in pixels formed in vicinity of signal lines and scanning lines aligned in a matrix form;
  a plurality of light capturing circuits;
  a first control line that controls an on/off operation of said display elements; and
  a scanning line drive circuit which drives the scanning lines,
  wherein each of said light capturing circuits includes,
  a sensor element which converts external light into an electric signal; and at least one of a second control line which controls an operation of said sensor element, wherein said scanning line drive circuit includes, a shift register including register circuits at a plurality of stages that shift a pulse signal with a prescribed pulse width in sync with pixel display timing; and a supply control circuit which controls a plurality of control signal lines based on the output signals of said shift register, wherein said sensor element is a photoelectric conversion element;

each of said light capturing circuits further includes:

an amplifier which amplifies an output of said photoelectric conversion element;

an output control transistor which connects or interrupts an output of said amplifier to a detection line;

a pre-charge transistor which initializes input of said amplifier;

a second control line which controls an on/off operation of said output control transistor; and a third control line which controls an on/off operation of said pre-charge transistor, said scanning line drive circuit including a supply control circuit which controls at least two signal levels among said first, second and third control lines.

2. A display device, comprising:

display elements provided in pixels formed in vicinity of signal lines and scanning lines aligned in a matrix form;

a plurality of light capturing circuits;

a first control line that controls an on/off operation of said display elements; and a scanning line drive circuit which drives the scanning lines, a level shift circuit which converts an output level of register circuits, wherein each of said light capturing circuits includes, a sensor element which converts external light into an electric signal; and at least one of a second control line which controls an operation of said sensor element, wherein said scanning line drive circuit includes, a shift register including the register circuits at a plurality of stages which shift a pulse signal with a prescribed pulse width in sync with pixel display timing; and a supply control circuit which controls a plurality of control signal lines based on the output signals of said shift register, wherein said supply control circuit supplies the output signal of said level shift circuit to the corresponding first and second control lines based on logic of the control signal supplied from an outside device.

* * * * *